US012476575B2

(12) United States Patent
Rajasenan

(10) Patent No.: US 12,476,575 B2
(45) Date of Patent: Nov. 18, 2025

(54) MICRO-ENERGY PLANT SYSTEM WITH QUICKLIME CONVERTER

(71) Applicant: Terry Rajasenan, Ellwood City, PA (US)

(72) Inventor: Terry Rajasenan, Ellwood City, PA (US)

( * ) Notice: Subject to any disclaimer, the term of this patent is extended or adjusted under 35 U.S.C. 154(b) by 105 days.

(21) Appl. No.: 18/467,699

(22) Filed: Sep. 14, 2023

(65) Prior Publication Data

US 2025/0096719 A1  Mar. 20, 2025

(51) Int. Cl.
*H02S 10/40* (2014.01)
*H02S 10/12* (2014.01)
*H02S 40/38* (2014.01)
*H02S 40/44* (2014.01)

(52) U.S. Cl.
CPC .............. *H02S 10/40* (2014.12); *H02S 10/12* (2014.12); *H02S 40/38* (2014.12); *H02S 40/44* (2014.12)

(58) Field of Classification Search
CPC .......... H02S 10/40; H02S 10/12; H02S 40/38; H02S 40/44
See application file for complete search history.

(56) References Cited

U.S. PATENT DOCUMENTS

| | | | | |
|---|---|---|---|---|
| 4,776,171 A * | 10/1988 | Perry, Jr. | ................. | F03G 6/005 518/704 |
| 6,071,329 A * | 6/2000 | Zhang | ................ | B01D 39/2072 95/137 |
| 10,389,121 B1 * | 8/2019 | Sherry | ...................... | H02J 3/02 |
| 2004/0124711 A1 * | 7/2004 | Muchow | ................. | F24S 25/10 307/64 |
| 2005/0282591 A1 * | 12/2005 | Shaff | ................... | H04M 1/0202 455/572 |
| 2008/0196329 A1 * | 8/2008 | Kennedy | .................. | E04H 9/12 52/169.6 |
| 2008/0196758 A1 * | 8/2008 | McGuire | ................ | H02S 10/40 290/55 |
| 2008/0314438 A1 * | 12/2008 | Tran | ...................... | H10F 77/484 136/248 |
| 2019/0210860 A1 * | 7/2019 | Bourke | ................ | B67D 3/0083 |

* cited by examiner

*Primary Examiner* — Sadie White

(57) ABSTRACT

A portable human performance, renewable clean energy generator and pollution control system, with devices and associated methods to create mechanisms, paralleling organic flower plants for users to quickly harness it to improve their human performance. Knowing what mechanisms in a system should not operate at what times is crucial to force multiplying limited resource inputs. A tipping points arbitrage predictive model method leverages all mechanisms' operations toward specific needs of users, bending supply to meet demand, reducing waste and increasing output, whether in energy or human performance. Especially for disasters, when electricity is less reliable and portable generators are often used yet emit dangerous levels of carbon emissions, and even at low levels reduce human performance. This invention harnesses primarily heat, not fossil fuels. Synergistically, chemicals used for human performance provide heat, helping reach advantageous renewable energy tipping points, while reducing risk of adversely exceeding human performance tipping points.

5 Claims, 11 Drawing Sheets

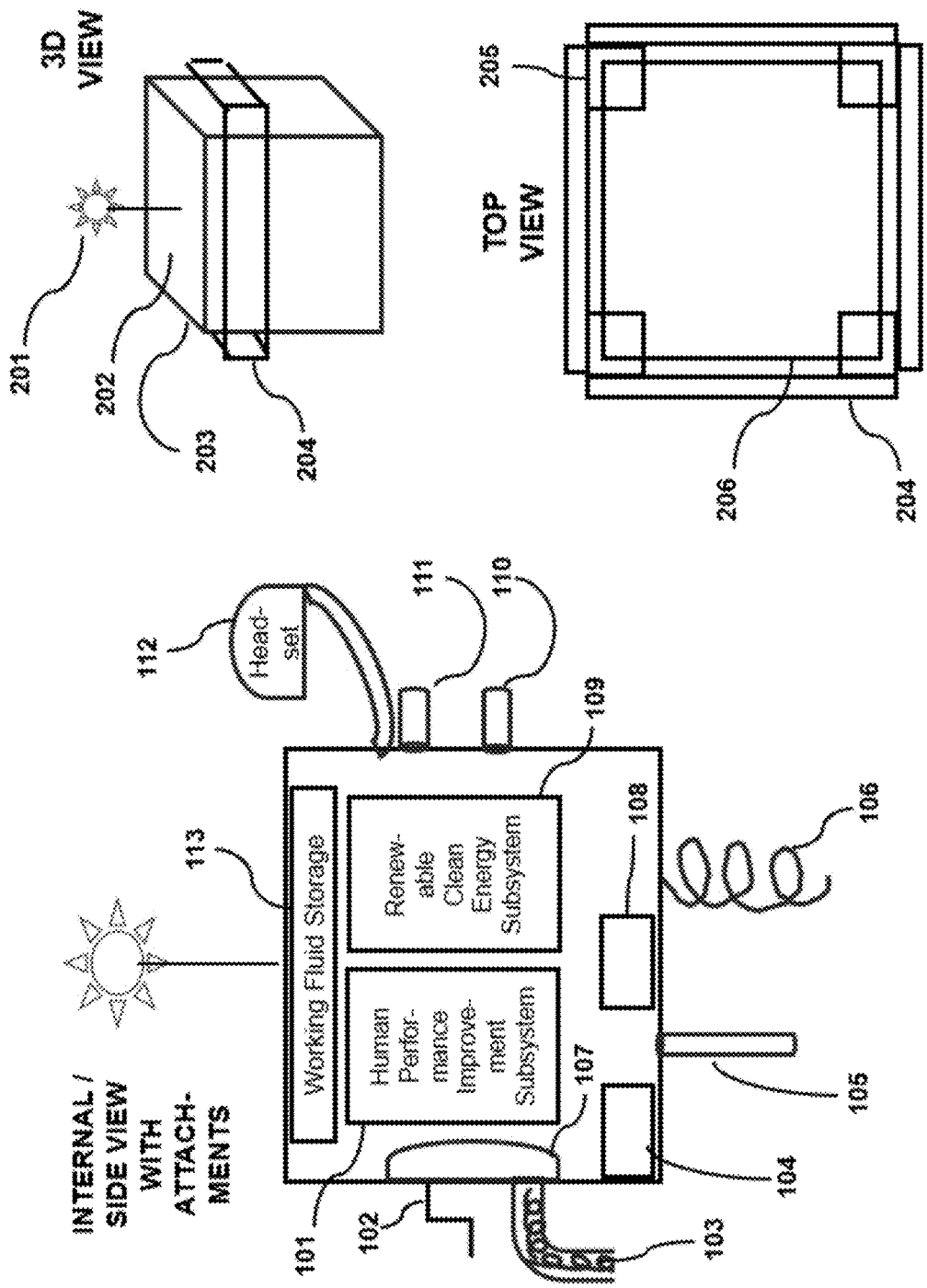

The way we view belief and behavior change is that there are forces pulling on them, similar to how gravity pulls spacecraft going between the earth and the moon.

- In astrophysics this is called "free-return trajectory"

* In orbital mechanics, a free-return trajectory is a trajectory of a spacecraft traveling away from a primary body (for example, the Earth) where gravity due to a secondary body (for example, the Moon) causes the spacecraft to return to the primary body without propulsion (hence the word "free" inside the term) [source URL: https://en.wikipedia.org/wiki/Free-return_trajectory]

- Priority Imprinting uses concept we also term free-return trajectory to explain how we maximize effect we have when confronting serious limitation in time and resources

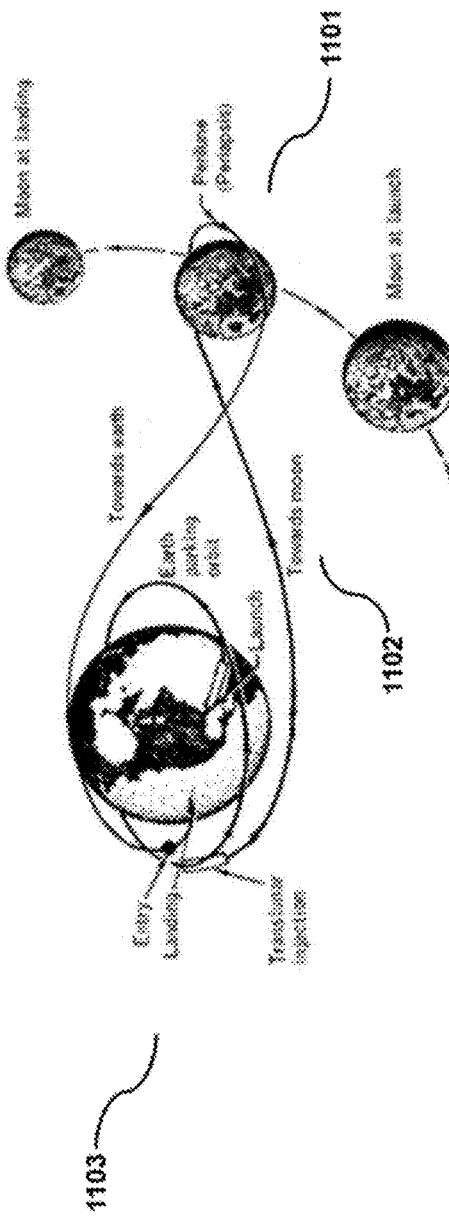

Fig. 11

MICRO-ENERGY PLANT SYSTEM WITH QUICKLIME CONVERTER

CROSS-REFERENCE TO RELATED APPLICATIONS

This application claims the benefit of U.S. Provisional Appln. No. 63/406,633 filed Sep. 14, 2022, which is hereby incorporated by reference in its entirety.

COPYRIGHT NOTICE

A portion of the disclosure of this patent document contains material which is subject to (copyright or mask work) protection. The (copyright or mask work) owner has no objection to the facsimile reproduction by anyone of the patent document or the disclosure, as it appears in the Patent and Trademark Office patent file or records, but otherwise reserves all (copyright or mask work) rights whatsoever.

FIELD

The present application relates to a system of a device and associated methods that improve disaster survival and overall human performance, with key subsystems for renewable energy (against climate change) portable generators, pollution control, and emergency preparedness.

BACKGROUND

Certain devices are needed and used in both emergencies (e.g., from climate disasters or from conflicts), as well as in daily life to improve quality of life. A photovoltaic solar generator is one example, as is an air filter or hot plate. Combining these varies elements did not make much sense in the past since it meant a bigger, less portable, and more expensive device to lug around in an emergency. There was insufficient synergy between these devices to create a disproportionate value in combining subsystems that could be crucial during crisis. However, there have recently been significant changes in both needs and opportunities that change this situation. Priorities have been reordered for societies in the foreseeable future to being: 1. National security and civil defense, 2. Energy and climate change (as they currently most often compete against each other), 3. Supply chain, 4. Social Contract (and societal breakdown, including crime), and 5. Public health and basic health needs. For a growing number of individuals at various times in their life, there is now a much greater risk of catastrophes that will threaten not only quality of life, but now also survival, as it encompasses needs like: 1. Safe and breathable Air, 2. Water to drink and for other purposes, 3. Sufficient Food, 4. Safe Temperature range via heating and cooling, and 5. Basic safety (including communications and information through smartphones) and preventive health. Electrical or energy power is crucial to all five. This invention of a "Micro-Energy Plant" (MEP), which started initially with a quicklime converter for heat, electricity, and an "invisible mask" (QCHEIM) of protections against air toxins and microbial threats, is focused on addressing these growing needs in this new global environment, one that is more dangerous to survival, but also more difficult to maintain reliability and productivity, and one in constant need of more energy, especially more renewable clean energy. The reason is planetary and local atmosphere degrading, and its consequences. Ultimately, the invention is a portable pollution control, renewable clean energy and human performance system, with devices and associated method, paralleling organic flower plants for users to quickly understand and harness it to improve their human performance. It is especially valuable for disasters, when electricity is less reliable and portable generators powered by fossil fuels are often used by individuals and their neighbors, but these portable generators emit dangerous levels of carbon emissions. New research has shown that even low levels of carbon dioxide and especially carbon dioxide, though, can reduce human performance and health, mortgaging an individuals' future as it also does to the planet's future. Experts say that pollution is one of humanity's greatest threats, and carbon dioxide is now a recognized pollutant, which this invention reduces in multiple ways. The invention's system harnesses primarily heat, which is growing all over the world, and not fossil fuels (which are shrinking in supply). Heat also reduces the efficiency of most renewable energy used in homes today (namely solar and wind power)—but this invention actually harnesses heat for efficiency gains. With temperatures rising on average globally, it takes us closer to the boiling point of water (100 degrees Celsius, when summer temperatures are capable of producing home driveway temperatures of 70 degrees Celsius)—and the energy conversion efficiency of steam engines. In short, a warming planet gives this approach a head start to get to one of the highest efficiency heat-energy conversion mechanisms there is. Also synergistically, the same chemicals used for improving human performance provide heat, reducing risk of adversely exceeding human performance tipping points—all while helping reach advantageous renewable energy tipping points. For instance, quicklime (calcium oxide) has been used for at least a century to cook food or boil water.

I moved in the direction of this invention given that in my initial research, originally I thought that cognitive capacity was basically static, and focused on a person's abilities relative to their cognitive function, which is the mental processes and abilities that enable individuals to perceive, process, store, and use information from the environment. It encompasses a wide range of mental activities, including perception, attention, memory, language, problem-solving, decision-making, and reasoning. Cognitive function is a broad term that encompasses various aspects of mental processing. But then I realized cognitive capacity can drop more significantly over the course of the day beyond what I expected, based on observational research made during the Covid-19 pandemic and the war in Ukraine, and the tolls disease and conflict took on self-reliance dependent on human performance. It included internal factors in the body such as buildup of waste products in neurons and thus mental fatigue, but now also those external factors that affected cognitive function and human body impairments, such as from pollution (especially carbon emissions) and "information pollution" (i.e., information overload or misinformation), making it difficult for human activities and behavior to help people reach their daily objectives, let alone life goals. Loss of cognitive function directly impacts cognitive capacity determination, while enhancers to cognitive function to reverse this and increase capacity. I realized cognitive capacity had many more factors to incorporate, as the original understanding was the only option for an individual was simply reduce cognitive load, given my view that capacity was static (with cognitive capacity as I'd defined it as the point where task load levels led to a significant rate increase in errors or slowdowns in a work effort). But even if it is more dynamic than I first realized, I had down it could still be predicted, relative to each type of activity and its mental and physical demands, if we incorporate more external factors. And even more valuable to improving human performance is the fact that we could now change the cognitive bandwidth equation (i.e., cognitive capacity minus cognitive load) from BOTH variables in a single individual, rather than just one variable for an individual, versus the prior assumption that cognitive capacity could only rise when we could bring in other people onto the work task or process. Thus, we could bend the cognitive "supply curve" to better match the person's supply to their demand. Using a related method, called the Tasks At Risk Intervention Lead Time Analysis, we could also triage activities (and thus resource consumption), advising against expending resources when it would not result in a user reaching their objective. Users could be informed, or be aided in contingency plans to follow instead, like escaping current conditions, therefore managing their task load by changing to an improved-condition location, not just by time that tasks are performed, or partitioning (i.e., "dividing and conquering") a task load across a team of people. Energy and human performance can be viewed as both symbiotic and synergistic. Cognitive and physical functioning decreases when there are extremes in temperature, as well as other detriments to functioning such as pollutants. These can be addressed directly with energy, such as from direct heating or cooling using electricity. But they can also be addressed indirectly with optimized air gas ratios giving better cellular metabolism. This in turn gives greater resilience to systems in the human body. This resilience increases the tolerance to extreme temperatures and many other hardships, ultimately reducing preventable harm and deaths. But it also reduces the need for energy overall by increasing a human's ability to withstand extremes—and better compliance/problem-solving in areas like health and work.

The situation where this human performance is most critical is during crises and disasters, when self-reliance becomes most critical (but also in the case of something more mundane and routine, like work-from-home). Disasters are when cognitive loads can quickly spike, while cognitive capacity would not only stay relatively fixed (though neurotransmitters like dopamine and hormones like adrenaline could accelerate cognitive processing and thus capacity temporarily—though not sustainably), given the use of portable generators or other burning (e.g., or firewood or other fuels or even combustibles like paper or wood furniture, etc.) by people often during crises, and the impact that carbon dioxide and especially carbon monoxide can have on cognitive and physical functioning, that cognitive capacity can actually decrease, leading to task saturation and panic, and thus at least slowdowns in activities needed for survival, or at least of productivity maintenance for continuing work during a crisis and its aftermath—but it could also lead to catastrophic errors and preventable deaths (e.g., placing a portable generator too close to sleeping quarters and dying of carbon monoxide poisoning while a person sleeps, which I have seen happen in my own neighborhood during a power outage).

According to U.S. Pat. Nos. 8,212,142 B2 and 10,852,037 B2 as well as other PTO documents US 20140351010 A1 and US 20180369734 A1 (note: document details on patents in References Cited included with document), all found in patent searches and online searches (please see [1] in References Cited section), existing inventions are not synergistic between renewable clean energy and human performance improvement in their portability, especially for disasters, and only seem to have "additive" arrays of renewable and other sources of energy, not force multiplying, because they do not harness the power of "tipping points" (i.e., the inflection point of a curve, where problems or opportunities rise at a much faster rate) and "arbitrage" (i.e., when these tipping points are invisible or non-obvious, they are considered hidden, and arbitrage is the finding and obtaining of disproportionate returns from hidden information). Tipping points arbitrage is a key advantage. Prior art where I contributed (U.S. Pat. No. 8,073,731 B1 and U.S. Pat. Nos. 8,407,081 BI and 8,515,777 BI) that harnesses "arbitrage" such as for processes (e.g., based on cognitive tipping points) use Similarity-Based Learning for a Meta-Level Manager to be able to learn and thus predict what can optimally work for a given scenario of current inputs and historical patterns of inputs. This arbitrage takes various energy sources from an only "additive" level (where some higher ROI options are never able to be "activated"), to a "multiplicative" level, harnessing options that before were not available but now are given leverage of other small amounts of energy to "catalyze" creation of a disproportionately larger amount of energy. My advance on renewable clean energy, based on my past work, is an array of energy conversion mechanisms being force multiplied by "seed energy" (analogous to a hydrogen bomb, where the fission portion's smaller relative energy is used to then start the much greater fusion process of an H-bomb).

This new invention also harnesses a set of wireless controllers, tied through a mobile web solution to access a person's calendar on their phone, to enable predictive modeling to be able to estimate what to do with energy available to be produced (e.g., crank), stored (e.g., electric or thermal battery), or expended (e.g., in heating a certain mechanism vs. another), based on what the minimum needs are vs. opportunities expected, then some slack for the unexpected. The systems predictive model methods ensure the best chance of "reaping" the most from an energy "harvest." Else one may—figuratively—be planting in autumn and trying to harvest in spring, which leads to a much worse yield of crops, in this case energy—as well as human performance, whose elements are finite and must be conserved to ensure completion of challenging activities. The gain we can expect should be 2 to 3 times more on average by switching between energy conversion mechanisms to maximize the energy that flows to the most efficient conversion mechanisms, rather than using just the additive array of renewable energy, and one that also ties to getting humans to perform energy-generating tasks (like turning the crank generator, such as with themed accessories, like a boxing speed bag motion double-side crank, or even a boxing-themed shake-magnet in coils, both tied by clip-on wires to the MEP battery voltage regulator circuit included in an embodiment), to help the machine then power more human performance mechanisms (and biceps) thanks to that "seed energy" from the crank, which can harvest energy to run the chemical reactions for optimized air composition for tasks confronted by the end users, providing improved human performance and cognitive performance if the reactants are available. However, even if there are no reactants and just energy, improvement in human performance is still possible, such as from the ability to cool the user to a more optimal body temperature, or using electrochemical means to reduce carbon dioxide and increase oxygen. This is what we mean by leverage that is possible, even from a simple "manual override" in the renewable energy generation process of using a crank-based generator to have humans themselves provide the seed energy to essentially "catalyze" the key subsystems' processes. There are a number of practical applications and studies that relate to the potential value of this type of approach to human performance and renewable clean energy that can be additionally studied [2]. Bottom line is that humans and the machines that generate electricity for them need to cooperate further to synergize, not just for surviving disaster, but also to figure out together how to increase electricity (including conservation) and increase overall human thinking and problem solving, whether in a disaster, or in daily productivity.

SUMMARY

The disclosed exemplary embodiments provide a system in which at least a major portion of its functions relate to human performance and renewable clean energy subsystems. These subsystems lead to "force multiplication" of human performance inputs such as current levels of comprehensive cognitive bandwidth in order to accomplish more work in less time, with less errors, or both. It does similar force multiplication on renewable clean energy systems, achieving higher levels of electricity output by determining ways to use more available energy in the surrounding environment and to increase the efficiency of the overall conversion from the original energy source, by selectively activating and deactivating systems that synergize to try and reach the most efficient energy conversion that can best match the current and predicted upcoming situations, especially to reach positive tipping points (like boiling point of water, or cognitive tipping point for a person where they achieve motivation) and to avoid negative ones (like the cognitive tipping point for a person where they reach cognitive overload). Both these goals are achieved via a method termed as "tipping point arbitrage" (TPA) which has been harnessed in load balancing multiple person resources. This invention helps an individual or group using the invention to force multiply themselves, using air composition transformation as a crucial enabler. Predictive matching of supply to demand reduces waste of limited resources and opportunities. Knowing what mechanisms in a system should not operate at what times is crucial to force multiplying resource inputs. TPA manages and leverages all mechanisms' operations toward specific needs of users, bending supply to meet demand, reducing waste and increasing output, whether it be in human performance and productivity or in renewable clean energy efficiency. In one embodiment the renewable clean energy system has an array of heat conversion mechanisms, and a default heat conversion mechanism. More mechanisms can be added to the design as desired and materials available in the users current situation. Human performance improvement follows the same approach in its mechanisms, wherein a person can maximize their efficiency by "bending" their capacity limits to more closely match the demands expected on their capacity for safe and realistic time periods. Given one mechanism will be more efficient than a different mechanism in certain scenarios, situational awareness of the device using AI software methods is crucial, and is accomplished through a tipping point arbitrage predictive modeling regulating mechanisms within the device, assisted by a smartphone in the first embodiment to attain the force multiplication of limited resources, for the highest resulting value. Further embodiments with their specific features, advantages and properties of the system according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIG. 1 is an internal and side view of the main device, which is the housing for the system, and key accessories, according to a first embodiment.

FIG. 2 is a 3D perspective view and top view of the man device according to a first embodiment.

FIG. 11 is a visualized analogy for understanding the human behavior and performance method of Cognitive Free Return Trajectory (CFRT).

DETAILED DESCRIPTION

Figure 3:
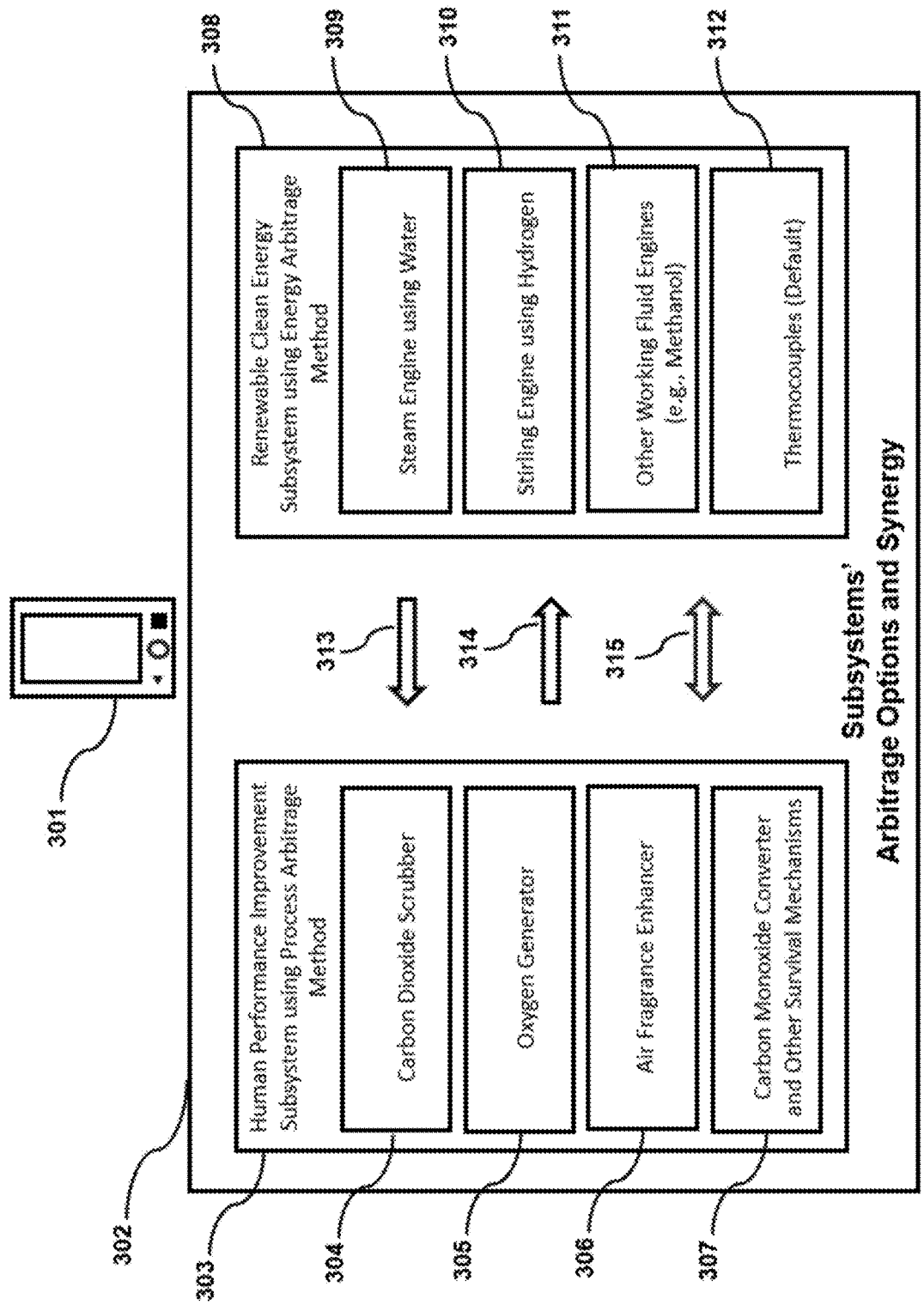
FIG. 3. Subsystem for human performance (HP) and cognitive function (and health/survival) such as CO2 level, O2 level, thermal regulation level, etc. and subsystem for renewable clean energy and the heat conversion mechanisms where Energy Arbitrage is applied.

In the following detailed description, the system according to the instructions on how to create the invention in this application in the form of main device, accessory devices, and all associated methods will be described by the embodiments to follow. However, it should be noted that although only two subsystems are described in the teachings of this application, it can also be used with other related subsystems and for any set of mechanisms that address energy production or human performance improvement, ranging from survival scenarios during conflict or climate-change disasters, to personal crises such as heat waves and temporary power outages, to routine, everyday objectives sought (such as productivity at work or school) that benefits from a portable device that can ensure people are at peak performance when they need to be, and have the energy to at least survive in a crisis or operate the device wherever they may to gain some benefit from its operation.

This invention is technically a portable human performance improvement and renewable clean energy provisioning system, but for simplicity's sake, is called a Micro-Energy Plant, given its ability to capture carbon dioxide, generate oxygen, and "grow" energy (though not in calories but rather in watts). However, just as all animal life owes its ability to sustain and grow to organic plants, humans can thrive from Micro-Energy Plants in multiple ways, and not simply by reducing carbon emissions, but rather by cost-effectively managing limited chemical and energy resources needed to do that carbon-reducing process, as well as the limited resources in the human mind and body that takes time to recharge when people are undertaking activities that enable them to achieve a set of desired objectives. This sort of conservation of resources requires rather precise management and regulation of resources used, as well as "changing the way people think" in order to imprint a mindset of conservation and avoiding carbon emissions.

By creating a system that first determines crucial, and often hidden, "tipping points" and then employs "arbitrage" to get disproportionate returns from hidden information, we create synergistic benefits to humans between a renewable energy subsystem, an emergency preparedness subsystem, and a pollution control subsystem. This synergistic effect means less input resources are needed, more available resources (including energy, both within and outside the system) can be harnessed, and more productive work and less destructive activities can be achieved by human end-users. This is all accomplished by focusing foremost on cognitive and physical resilience and human performance. These tipping points can include human performance-related ones like cognitive capacity or delayed gratification tipping points, energy-related ones like for the boiling points of working fluids (e.g., water in steam engine), and survival-related ones such as what temperature water must be heated for what amount of time in order to become reasonably safe to drink (e.g., 71 degrees Celsius for 5 minutes).

A first embodiment of the primary device for MEP system is illustrated in FIG. 1, starting with what is needed at a minimum to create the invention. This includes a portable, puncture-resistant (given a thermal energy storage system requiring a working fluid, such as water, that is found at the top to capture solar heat 113) container subsystem, which is a housing for all of the internal components, and comprised of wood or other sturdy solid, a human performance improvement subsystem 101, and a renewable clean energy subsystem 109. Then there is a hand crank 102, and a mechanical energy input 103 for attachment to water or wind turbines, but made from an augur in order to transmit the energy even if there are bends between the embodiment and its source of mechanical energy like rain runoff (or alternatively raindrop energy can be captured by a matrix of shake magnets in a coil as an accessory, with wires attached to voltage regulator circuit of battery in an embodiment). There is a gearbox with attached dynamo set 107, such as a 30 watt generator purchased to make a small windmill, or using e-waste such as extracting the 30 W permanent magnet motor found in a portable camping fan, There is also a lead acid battery 104, a wireless controller and relay system 108, comprising, in a first embodiment, a Raspberry Pi Pico W wireless microcontroller per mechanism in each subsystem, with an attached relay, such as a multichannel relay that can activate or deactivate all the electrical components of a specific mechanism in the subsystem, including electronic valves, heating elements or devices, fans, pumps and other components. This can also be where optional "onboard intelligence" from computing devices like AI chips (e.g., NVIDIA chips) can reside, in the event the user wants to enable some portion of a sophisticated tipping point arbitrage system when the World Wide Web or even a smartphone are not available. There is also a drainage system 105 for the entire housing and any reactant containers and reaction chambers that may require draining from time to time. There is corkscrew-type of heat source or heat sink "root" 106 for the embodiment to use the soil as an energy transfer option. There is a air intake 111 for room air or can be connected to a hose, and a converted and optimized air exhaust 110. Rather than relying on making substantial changes to a volume of air the size of a room, the micro-targeted human performance headset 112 is a way to micro-target the optimized air composition (including its gas ratios and other gaseous additions) to the end user, focusing not only the air composition but also managing other sensory information to best match the activity needs of a user and match their cognitive supply with their cognitive demand. Once an MEP's mechanisms can be included as necessary and viewed in its entirety, there will be, in a preferred embodiment, a study of the heat in different areas using a thermometer gun, and then insulation added to prevent unwanted heat transfers.

It is important to note that the MEP is portable, and can have both indoor and outdoor applications, wherein outside it is more for renewable clean energy while indoors it more for human performance improvement. Thus, different accessories are oriented more toward one subsystem's use than the other's. However, in an underground shelter, like a storm cellar, there is a chance that both subsystems' mechanisms may be in use concurrently.

As illustrated in FIG. 2, in the first embodiment, the foldable box structure 203 has atop it a solar heat collector 202, comprising an aluminum metal sheet painted black with high temperature paint. The objective is to create a solar-powered "boiler" (even though the temperature does not need to reach boiling, since for anything more than a quart of water to reach boiling on a sunny day without a heat concentrator, such as an optional Fresnel lens, would take more hours than available even on most sunny summer days). So in addition to solar collectors, the first embodiment would use a working fluid of water, though a second embodiment could use methanol, since it has a lower boiling point if the working fluid in the system is not just for heat transfer, but is routed into the actual engine as a working fluid, to reduce heat loss from the heat transfer fluid through the use of a heat exchanger. The box is "crowned" with an artificial flower (such as sunflowers as shown) as a façade 201, and depending on the heat resistance of the flower, may need a protective transparent covering protecting it from the heat. A user can do fluid intake (needed for thermal heat storage working fluids or chemical reactants), addition of quicklime into its container, or other insertions, removals, or maintenance by moving up one of the removable panels 206 that slide upward and can even be removed (and with sufficient strength to prevent inadvertent puncture for a typical impact the foldable box structure to protect its contents), or in a second embodiment, a fluid intake can be an optional component from the top. There are load-bearing solid posts 205, comprised of wood or other sturdy solid, which are placed on hinges like that of a folding table's (except it would an upside-down table, as the thickest solid surface is on the bottom of the box 203, with the posts pointed upward, and folding downward when packing it for portability) with a similar locking mechanism to a folding table, to keep the leg in place once upright. There is a bracing structure 204 comprised of wood or other sturdy solid encircling the box to serve as both a handle for carrying this housing of the system, and to make the box structure more sturdy and thus less at risk of bending or breaking outside or inside the box. The posts have slots to hold the removable panels. Inside the box is a drainable containers set consisting of one or more drainable containers comprising materials with good heat conductivity to capture heat from surfaces it is in contact with or in near proximity, since we want heat to be able to be channeled to other areas via heat pipes. However, as needed, insulation can be added to reduce any heat transfers. The drainable containers are positioned within the box structure, where the containers may hold reactants or working fluid, whether solid, liquid, or gaseous. Working fluids can be used as a thermal energy storage system, comprising an inlet for filling with working fluid, and an outlet for draining working fluid. A method of operation comprises filling the drainable containers with necessary working fluids (e.g., water), reactants, or other materials needed for each mechanism used in the subsystems. It should be noted that the system will have a wiring system for all mechanisms and other components that require electricity, and will use wiring that works well with 12V/3 A.

A second embodiment would be a scaled-down system to place inside small-cubic foot areas, such as safe rooms, or in vehicle trunk areas or unoccupied space in the engine compartment, for improving the human performance of occupants in that small area, such as a vehicle cabin, which omits all components that are unnecessary to provide key inputs of heat, electric power, mechanical energy, and other requirements for the human performance subsystem, since those said key inputs may be obtainable from the vehicle itself, or from other sources, in order to conserve space and reduce weight. In a third embodiment, there can also be a further scaled-down unit that becomes a wearable item, or at least a "MOW" (i.e., an "MEP on wheels").

FIG. 3 illustrates the two crucial subsystems for the invention and the first embodiment. A user's smartphone 301 is part of the system in a preferred embodiment (and the system also ensures the ability to charge a smartphone, as it is considered essential to the human performance and energy optimization processes). The architecture is designed to co-exist optimally with a smartphone's computational power and information access/storage, but also to overcome lack of a smartphone It serves the means of determining a number of activity and cognitive load issues related to the user, as noted in a prior art (U.S. Pat. No. 8,515,777 BI) behaving like a sensor collection by offering the means for a user to share information they would like to share to enable the embodiment to perform its predictive modeling and tipping point arbitrage. For example, it would request access to the user's calendar (for important presentations at work, exams at school, studying and preparation sessions for events, etc.) via an MEP mobile web solution, with servers managed remotely from the unit. Similar to navigation apps such as Waze in road mapping through mobile tech aggregation by Uri Levine (U.S. Pat. No. 8,958,979 BI), it can request GPS data, but also accelerometer data like a FitBit unit would request, all as sensor data to help infer activities and scenarios that then improve predictive model accuracy. It also serves as the primary intelligence of the system, especially if it has access to the World Wide Web (WWW). The key methods utilized are predictive modeling algorithm, which can be simple or complex, that determines, with a reasonable level of accuracy as shown in past implementations of human performance improvements if following basic principles (Brennan et al, 2012), in one embodiment, how to predict the optimal conditions to activate or deactivate various mechanisms, which can be viewed similarly to a team that needs to accomplish some objective. One component of the model must determine each energy conversion mechanism's activation point and its predicted efficiency level for the current situation of energy sources, energy reserves, energy storage capacity, and energy needs. Another component of the predictive model also determines the energy potentials for the energy sources available to the invention, another (if given advance data of conditions) recommends during assembly what working fluids to use and maintain over time based on sensor network, and another the predictive model determines the current local end-user's comprehensive cognitive tipping points and thus the optimal tasks that can be executed reliably in a fixed interval available to complete them, whether for obtaining energy, or reaching any objective.

As noted, a critical factor is understanding and identifying in advance the various "tipping points" that offer the hidden, disproportionate returns. Triaging is critical to getting disproportionate returns in human performance or energy generation. Put simply, just because a system "can" does not mean that it "should" run all mechanisms. The concept of Tasks At Risk Intervention Lead Time Analysis, or TAR-ILTA (Brennan et al, 2012), which is crucial for a load balancing smartgrid as found in a Cooperative High Reliability Organization (CHRO) to become what is a truly smart grid, since power is the rate of energy consumption. That is, something that needs 300 watts needs energy to come to it twice as much as something that is 150 watts, so it will consume energy found in a fuel or storage source twice as fast. TAR-ILTA on a smartgrid ensures that energy is expended when it is known to prevent something downstream that would take up much more energy, or create much more problems, and then have automated or human activation of systems to prevent those predicted problems. Just as importantly, it would triage—not wasting limited energy if the odds of meeting the need are too low, and would ultimately be wasted. Thus, the predictive modeling based on the tipping points of when actions are deemed to have reached a stage of optimal action or inaction is key to ensuring higher efficiency and effectiveness in the use of energy. However, it also key to the generation or willing conservation of energy also, meaning that tipping point activation within humans matters to make or save energy. TAR-ILTA is what enables a Performance Improvement Coordinator (PIC) for any system (whether the PIC is automated or a human) to ensure that arbitrage can be performed for the greatest possible gains, having hidden information on tipping points and prevention values. Examples of CHRO frameworks using technology for tipping point arbitrage implementation exist (Mort et al, 2017), which can alert when task failures are imminent and require early interventions to prevent worsening of costs and risks, especially in an isolated Self-Sustaining Capsule (SSC) in a disaster zone. An SSC can be a basement/underground shelter, but even an attic/above-ground shelter, as you might find in a panic room or safe room.

For a different scenario, a second embodiment does not require having access to the WWW, since the smartphone can do computations using a simple downloadable program that functions as basically a decision tree that, if provided certain user input normally obtained from the WWW, can still wirelessly and thus semi-automatically (even if predictive model data feeds aren't completely automated), activating and deactivating subsystem mechanisms. In a third embodiment, if the smartphone is damaged, an optional embodiment to address that scenario would harness AI chips (e.g., NVIDIA and the other necessary hardware to have it perform complex and intensive AI for the comprehensive predictive modeling) and other onboard circuitry to do portions of the predictive modeling itself, and a keyboard for users can also be built in for that scenario. Worst case, the machine can simply be operated manually since the relays used to activate subsystems be pressed manually, or with little effort be bypassed entirely.

But if the invention is in its preferred embodiment, it will have access to servers on the WWW that will be dedicated to harnessing state-of-the-art and ever-evolving AI but also real-time information sources such as for weather (including wind speed and directions) and pollution, or data sources such as for topography and proximity to carbon emission sources, especially powerplants and industrial mills. The smartphone then interfaces to the wireless microcontroller that then activates and deactivates subsystem mechanisms to accomplish process arbitrage (FIG. 9, detailed later), for increasing tipping point capacity for key activities or tasks, and/or reducing overload by prioritizing tasks for an individual to load balance over time, or distributing tasks to other to load balance over a group of individuals, seeking to capitalize on expected opportunities to excel in the outcomes of an anticipated set of activities given a set of demands and expected resource constraints. For energy arbitrage (FIG. 10, detailed later), it seeks to capitalize on expected opportunities to generate more power by finding the right investments of seed energy to be able activate a higher efficiency energy conversion mechanism.

Figure 6:
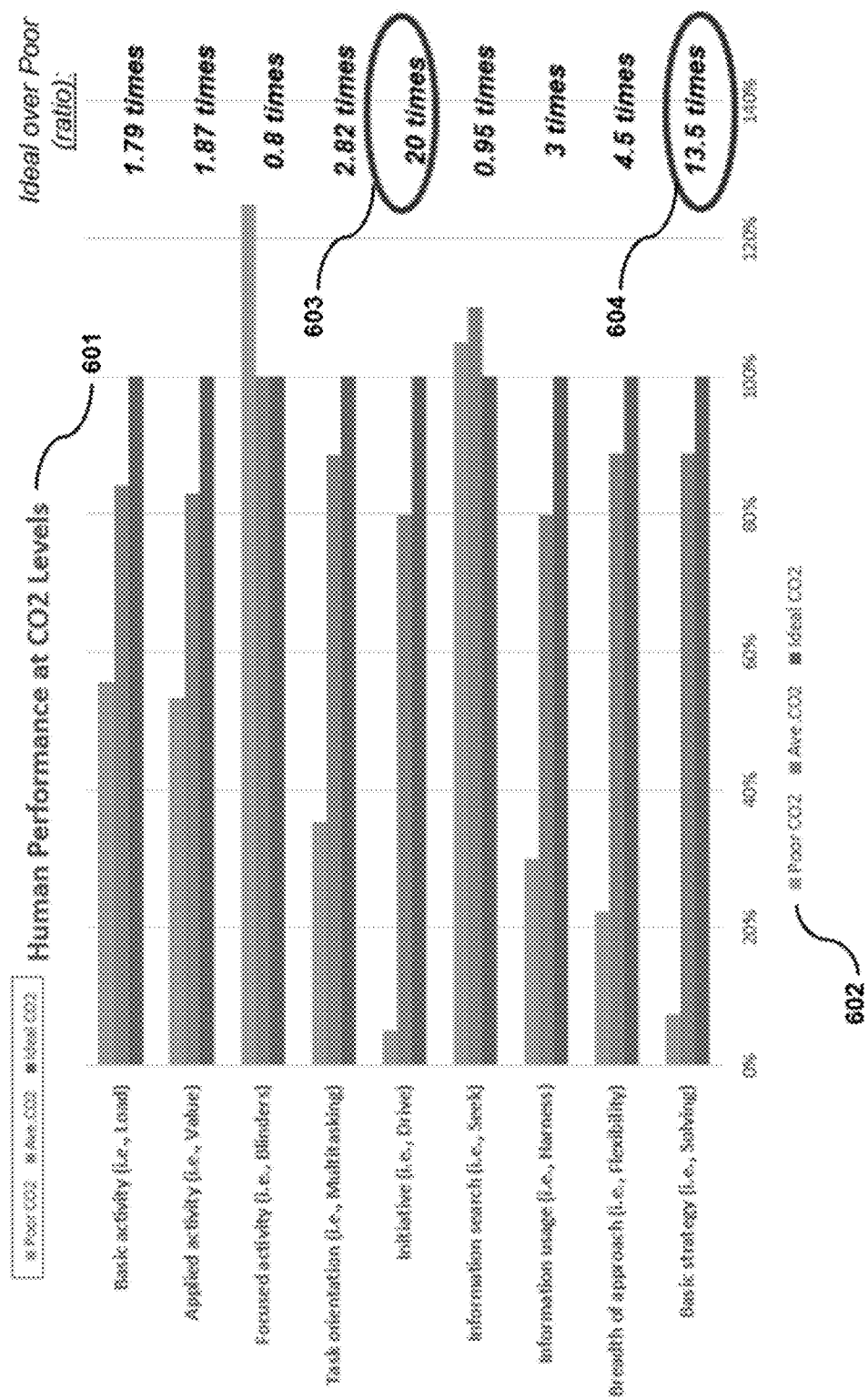
FIG. 6 is a graph showing carbon dioxide (CO2) impact on HP in various productivity areas.

The housing, which is the box structure 302 for the MEP's subsystems, as described in FIGS. 1 and 2, holds the two critical subsystems for the embodiment, which is the Human Performance Improvement (HPI) subsystem 303, that force multiplies human cognitive capacity using the Process Arbitrage method, and the other subsystem is the Renewable Clean Energy (RCE) one 308 that force multiplies renewable energy using the Energy Arbitrage method. Both systems and their key methods basically take an array of mechanisms, and using TPA, then maximize the outputs of human performance or energy. In the HPI, the most effective mechanism depends on the environment. For example, in polluted cities, there is less risk of oxygen depletion (as you'd find in a sealed underground shelter) and carbon monoxide poisoning (as you'd find near a portable gas-powered generator). So, the CO2 scrubber 304 is typically the "holy grail" of productivity and reliability, and it takes much less removal of CO2 (e.g., 0.25% lowered to 0.06% in the air, as seen in FIG. 6) than addition of oxygen (21% raised to 40%) to be able to realistically double cognitive performance. But an oxygen generator 305 is still a powerful improvement mechanism. A default substitute but also synergistic complement to CO2 scrubbing and O2 generation is an air fragrance enhancer 306, similar to what people plug into the wall. When mixed with O2-added and CO2-reduced air, fragrance offers the ability for people to situate themselves to where they smell the most fragrance to know they are getting the optimized air composition from the MEP. However, just the instructions of breathing deep to get the fragrance will improve blood flow to the mind, improving cognitive performance even without anything else, especially certain fragrances that have been studied for productivity gains, like cinnamon, citrus, and peppermint scents. A carbon monoxide converter 307 is needed only rarely for survival purposes, but in certain polluted areas, there may be low-level exposure that can lead to cognitive impairment and thus is worth attempting to scrub out, so can be one of many additional HPI mechanisms 307 to add to the array. Recent research has noted that levels much lower than previously thought can cause significant health issues, and also significant cognitive impairment. Whereas before, CO2 levels up to 5,000 parts per million (PPM) were considered acceptable, now that threshold is only 1,000. In addition, most carbon monoxide detectors do not activate until there are hours of readings above 70 PPM, and moreover take approximately 4 minutes to activate even at deadly levels. However, new research indicates that levels as low as 30 PPM can cause significant health concerns over time, and also cognitive impairment very quickly. But the challenge is that the body needs some amount of CO2 to be able to operate properly and regulate various systems. Moreover, even though oxygen is not deadly to the body, it can damage it if there are high concentrations for extended periods of time such as several hours, while also accelerating the body metabolism that may require greater levels of rest or recovery at a later time, and thus not sustainable and best in bursts. Thus, it is important to regulate the amount that likely will enter the body, and focus it into relatively short bursts that should not exceed 40% concentration in the breathed air in order to maximize at least cognitive performance if not other systems in the human body.

In the RCE, the holy grail of efficiency is the time-tested steam turbine generator mechanism 309, which is typically 35% or more efficient in converting heat into electricity. At smaller sizes though, efficiency drops, but part of that is inertia due to weight of metal pieces. So based on research it is possible and desirable to make a steam engine using 3D-printed components and heat resistant, durable, and lightweight plastic filament as feedstock for the 3D printer. Similarly, the Stirling Engine 310 takes heat and converts it to mechanical energy, but does not use water as its working fluid, but rather gases, whether air (but gives an efficiency of only 2%), or in a preferred embodiment, if available helium or, if it can be done safely, hydrogen, since both of those gases have better heat transfer properties, yielding efficiencies of 10% or more, and potentially 20% or more by using a prerequisite for this embodiment's design, which is an annular pipe regenerator. But for the embodiment to be able to harness a DIY approach and maintain easily, helium is undesirable. But in our outdoor version, the full MEP with a hydrogen working fluid would be buried underground, where the risk of spark and unmitigated explosion is much lower, and it would be charged by electrolysis over time until enough hydrogen could be pumped into the working fluid of the 3D-printed Stirling Engine. And the default heat converter is a thermocouple array 312, in this case multi-purpose Peltier Modules. Thus, we have three energy conversion mechanisms to thus have an array, albeit a small one. However, it is possible to add more mechanisms, as long as the mechanism can fit in the box and be attached to the controller. The resources fed by the RCE subsystem to the HPI subsystem 313 focus on electricity to power the HPI mechanisms. The resources fed by the HPI subsystem to the RCE subsystem 314 focus on heat from the HPI's exothermic chemical reactions, like quicklime to slaked lime solution, or hydrogen peroxide and bleach turning to saltwater, to power the RCE heat conversion mechanisms. The shared resources 315 between the subsystems includes the Peltier Modules, since they help in survival HPI by boiling water or cooling air, or a simultaneous water heater and cooler mechanism, as well as being a thermocouple from which to derive electricity. The crank is also shared, giving power to the HPI through the RCE, but then motivating humans to want to crank the RCE by putting a dopamine hit on the crank by turning the MEP into basically a surrogate slot machine since crank the MEP long enough and you will likely get a payout in extra energy the machine can measure (in watts).

Figure 4:
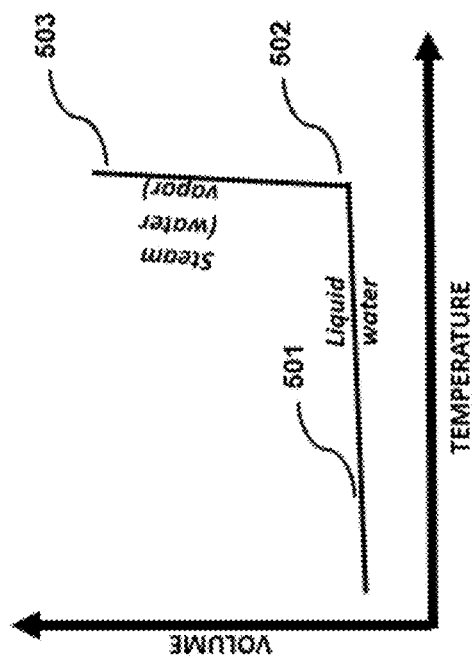
FIG. 4 is for cognitive tipping points based on Air Force HP bell curve.
Figure 5:
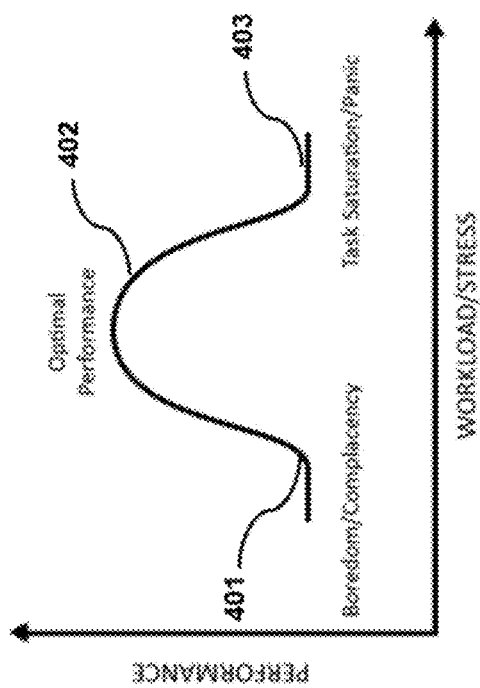
FIG. 5 is for energy tipping point of steam (i.e., water vapor).
Figure 7:
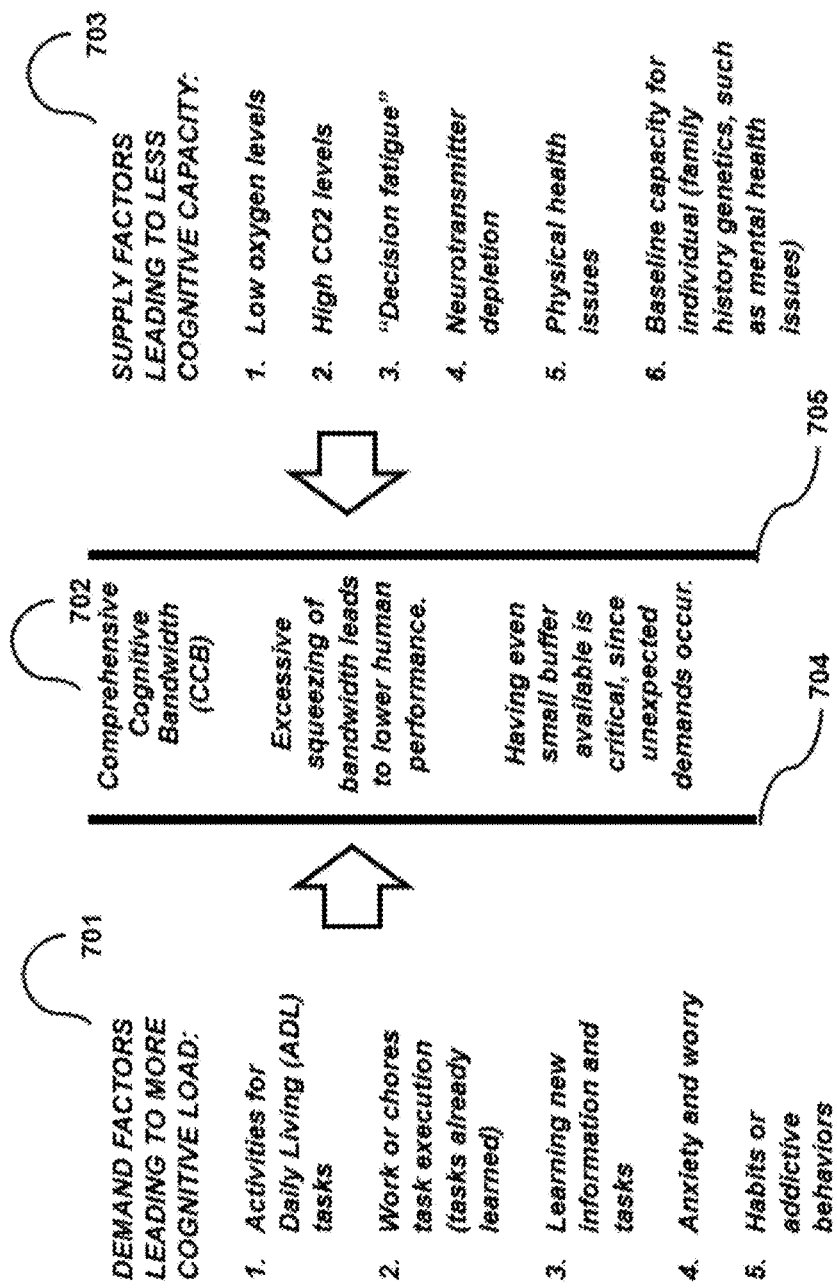
FIG. 7 is for understanding the elements of comprehensive cognitive bandwidth (CCB).

Clearly, methods of automated and user-driven operation and utilization are important to derive maximized results from a preferred embodiment. As such, there are several associated methods, several involving computational power found online via smartphone, or at least on a working smartphone with local wireless capacity, that require description. One is a regulator mechanism governing all subsystems. This mechanism is for "tipping points arbitrage" which is the use of a predictive model for navigating and arbitraging around various automatically-determined tipping points (i.e., an inflection point where there is a significant rate increase in something good or bad, as seen in FIG. 4 and FIG. 5), based on prior art (U.S. Pat. No. 8,515,777 BI) and additional research, in order to improve reliability, productivity, and efficiency, since overload and underload tend to be detrimental to those 3 objectives. Integral to it is the predictive model, in one embodiment it being an AI-managed application harnessing Similarity-Based Learning (SBL) in a Meta-Level Manager (MLM) to perform the tipping points arbitrage (TPA). TPA can also optimize for human performance and survival objectives using process arbitrage (i.e., what humans should and should not do), along with energy objectives using energy arbitrage (i.e., how energy should be "traded" and leveraged—so again, what to do and what not to do—in a system of multiple energy-conversion mechanisms) simultaneously, wherein the predictive model can instruct what order to do survival tasks in to maximize conservation of energy and other resources during crises but also for daily life (e.g., such that it would lead to lower energy bills). TPA, when coupled with the neurotransmitter management approach of Cognitive Free Return Trajectory (CFRT), as seen in FIG. 11, becomes an approach for increasing the ability to think and perform more rationally by increasing comprehensive cognitive bandwidth, as seen in FIG. 7, with demand 701, supply 703, and resulting bandwidth 702, determined from prior art analysis (U.S. Pat. No. 8,515,777 BI) of cognitive load 704 and limits 705. This is toward increasing human performance by also harnessing neurotransmitters that are often considered vulnerabilities (as they lead to undesirable addictive behaviors), in dopamine releases in the human brain, and more effectively by managing toward the two critical tipping points in FIG. 4, and using predictive models to match using arbitrage in an improved manner the deploying of the neurotransmitters in a load-balanced manner to improve memory permanence in learning, based on predicted amounts of neurotransmitters needed for expected activities based on data available.

There is also a method to construct the Micro-Energy Plant, comprising principles of "do it yourself", "right to repair", and the "IKEA Effect" (which notes that people have a higher perceived value and thus greater tendency to use those structures that they build to some degree), and then to also disassemble and reassemble the MEP quickly within a timeframe. There is a method for using software for mobile web solutions, geolocation mapping, and cognitive and physical task execution software (Mort et al, 2017). In a preferred embodiment, it harnesses data from the sensors for levels of carbon dioxide, oxygen, carbon monoxide, temperature, and more to then feed into a network of other MEP devices, where data can then be aggregated to determine problems such as "CO2 domes" (or domes of heat, smoke, etc.) and identify human performance-impacting risk combinations at much greater granularity and solutions much more micro-targeted to users based on trends from multiple data points, with escape or bypass routes mapped, but then also to correct the situation by operating certain mechanisms of the MEP "dome" problem area. If user's calendar on smartphone indicates user must have higher or peak performance, then a decision tree for the individual's departure route to avoid struggling with poor human performance during important periods, or correction plan by the users personally using the MEP, such as: 1. allowing it to operate on "autopilot" once predictive model says it is feasible and practical with available reactants or feedback from user, 2. user's agreement to wear a micro-targeting headset if there is a need to conserve reactants, or 3. offload of user activities or specific tasks by offloading to and load balancing these tasks with other users others. There is a method for box operation to maximize benefits, basically to ensure value of the MEP based on well-proven wellness principles as a baseline performance enhancement, but that are aided by other mechanisms of the MEP, but also its visual and sensory cues (e.g., the flower and the aromatic fragrance mechanism). This includes reminders on their smartphone and instructions for the MEP to "breathe deep to get the refreshing scent", with a notion of "stop and smell the flowers" stress relief too, then optimized air for CO2, O2, CO, and water vapor gas ratios make it that much more disproportionately valuable.

In the embodiment, the portable puncture-resistant container subsystem contains two or more human performance improvement mechanisms, comprising: a set of containers comprising removable chemical reactant holders, reaction chambers, working fluid containers, and working fluid pipe system. It also contains a carbon dioxide scrubber mechanism, which removes some portion of carbon dioxide found in the air that is pulled in via fan through the air intake of the human performance improvement subsystem, and that when its process completes, returns an air mixture with reduced carbon dioxide through the MEP box's exhaust vent. The carbon-scrubbing process itself uses exothermic chemical reactions of slaked lime (calcium hydroxide), which may be used directly (or substituted if necessary with chemicals of similar properties like lithium hydroxide), or may be instead created using quicklime (i.e., calcium oxide) and water, chemical reactions that capture the gaseous carbon dioxide and put into solid calcium carbonate as a result of chemically interacting with the calcium hydroxide solution once the intake air is pumped into the solution container's bottom via tube via small electric air pump, thus serving as a CO2 gas-to-solid converter mechanism that improves cognitive performance, and thus human performance. If slaked lime reactant levels are low or scarce, there is a way to use more abundant household baking soda (sodium bicarbonate) in an electrochemical reduction to formate mechanism, where the carbon dioxide is captured in solution (and then the waste solution dries into a solid salt that retains the CO2), using electricity generated from the renewable clean energy system. The oxygen generator mechanism that adds oxygen to the air mixture (i.e., air taken from the box's air intake and CO2 scrubbed air) and sends to the exhaust vent. It uses exothermic chemical reactions just like the CO2 scrubber does, in the first embodiment, using hydrogen peroxide and bleach in a chemical reaction that releases oxygen and heat. If these two chemical reactants are at low levels or scarce, an electrolysis mechanism can be used instead to convert water into oxygen and hydrogen gas using electricity generated from the RCE subsystem. It should be noted that the all electricity required, such as for associated pumps, heaters, fans, electrolysis, and other necessary electricallydriven components, for this HPI subsystem and all its mechanisms come from the RCE subsystem, which can be charged internally with its renewable clean energy components, or the MEP's internal lead-acid battery (or any suitable rechargeable battery) can be attached to an external 12V charger as well. The battery to operate all the subsystems can range from a small scooter lead acid battery of 30 watt-hours, to a large vehicle lead acid battery that may be 1.2 kW-hours. And in the event power is available locally, and more human performance must be achieved and in a quicker amount of time, these batteries can always be simply externally charged, given the sliding panels can be lifted up, similar to a car engine hood providing access, to then plug in any charging wires directly to the battery.

Figure 14:
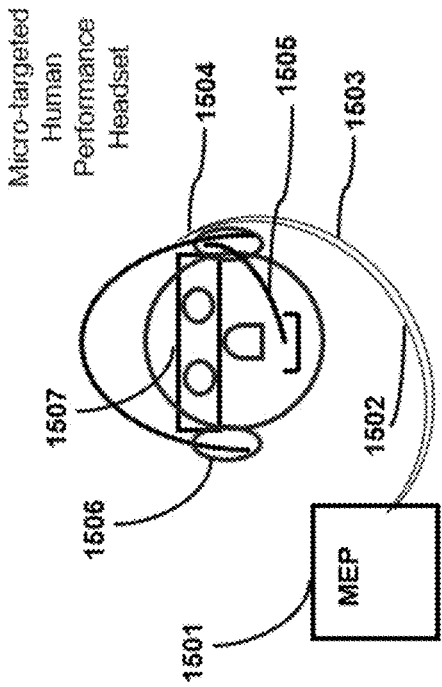
FIG. 14 is a visual of a survival and energy synergy example.

There is also an air filter mechanism comprising an intake air tube with fan powered by said renewable clean energy subsystem, an N95 or equivalent mask-based meshed wire screen with hooks or Velcro strips placed in intervals that match the size of a mask and can be added in a do-it-yourself manner, and optionally an electrostatic ionizer air filter for smaller particles after the N95 mask-based filter. Another key HPI mechanism that improves immunity during dry air conditions under 45% RH is a humidifier mechanism, comprising a water tray and an array of Peltier module thermocouples on its hot side, or a hot plate capable of achieving boiling temperature for at least two liters of water. This same mechanism can be used for boiling water to sterilize it. The same devices for the humidifier and dehumidifier mechanism can be shared, comprising a Peltier module array to create cooling effect on air intake for small areas, or for larger areas a compressor-based refrigeration mechanism, and with electricity to power the dehumidifier mechanism using electricity generated from said renewable clean energy system. a simultaneous water heater and cooler mechanism comprising a Peltier module array or a hot plate and compressor system for refrigeration. The Peltier modules can also be utilized on its cold side for the other HPI mechanism for water cooling, or if air is channeled through the cold-side chamber for dehumidification. An example would be in FIG. 14, wherein a shelter on day one has water they are boiling to drink, but once boiled in 1401, needs cooled in 1403 to drink, but we would not want to waste the energy, so we recover it using the thermocouples. So then by taking snow or ice from outside a shelter, a heat sink is thereby added for the Peltier Module thermocouple array to generate electricity on that day. Then day two, that same Peltier Module array 1402 (with thermal past enveloping heat-conductive containers, and insulation to prevent unwanted heat transfer, or thermal diodes/similar materials to maximize desired heat transfer) can be used to boil water from the prior day's warmed snow's water. This day, the Peltier Module array can be used to cool the boiled water to a drinkable temperature for faster drinking.

A surprisingly important HPI mechanism is the air fragrance enhancer, comprising: a fragrance reservoir for scented oils, a heating element to heat the scented oils, a temperature control for the heating element, a control mechanism to regulate the output of fragrance, and an aerosol dispersal component such as a fan. The reason is that certain scents can actually improve alertness and productivity, according to studies, while it also helps "guide" people to the air flow coming from the MEP exhaust, with one key instruction being to users "follow your nose" to find the optimized air. But it also offers another synergistic and beneficial instruction, relating to the MEP's flower is for users to take time to breathe deeply and slowly for 30 seconds when first activating the MEP system, which even without $CO_2$ scrubbing or oxygen enhancement still improves circulation in the body, improving human performance even if no other mechanisms are currently in operation. Given this set of benefits of the air fragrance enhancer, the artificial flower or plant serving as a façade for the overall system reinforces the analogy of the "Micro-Energy Plant" being similar to an organic plant. Optimized air and fragrance are crucial together.

Figure 17:
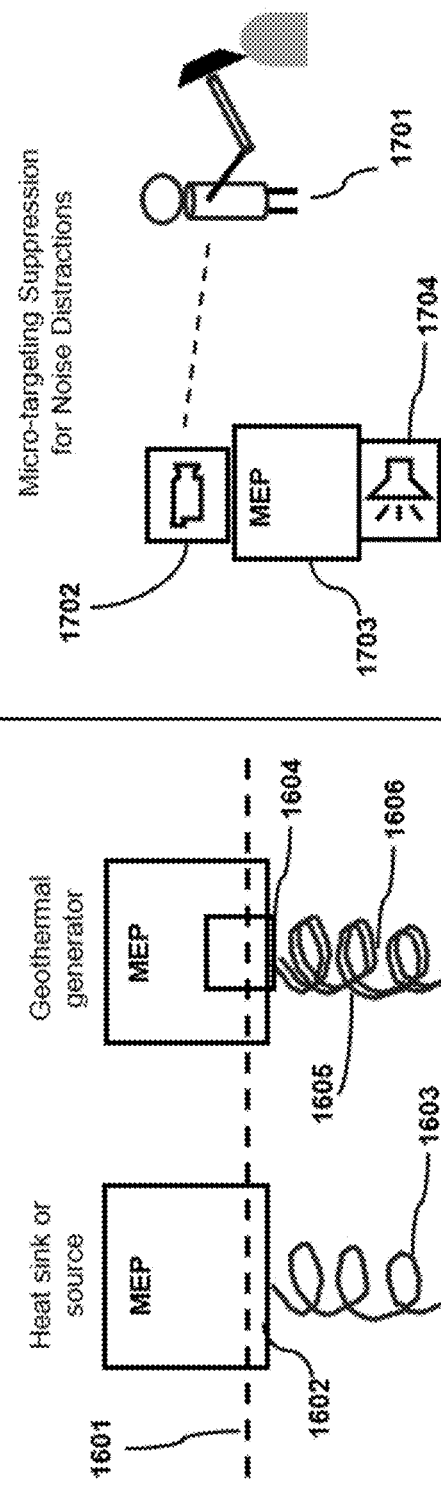
FIG. 17 is a simple view of an AI-based noise suppression applied to tipping points to improve cognitive performance and reduce post-traumatic stress disorder.

Another HPI mechanism involves those people who have poor delayed gratification tipping points, and are unable to tune out distractions and focus, making it difficult to maximize their human performance (e.g., students do worse in learning scores when they hear randomly timed noises). But it is also important in war zones where noise can create not only disruptions but fear and flashbacks to those suffering from post-traumatic stress disorder (PTSD). As shown in FIG. 17 in a first embodiment's accessory, this option enables a tipping point-based electronic noise filter for sounds that are repeated, but at intermittent, varying intervals, such as this person demolishing a rock 1701 (e.g., digging out survivors from rubble, doing construction activities, or even engaging sporting activities with significant noise concerns, such as pickleball) for improving comprehensive cognitive bandwidth tied to poor delayed gratification tipping points. It uses the principle that light is faster than sound, and the time in between can be used for sophisticated AI video processing from video camera 1702 with advanced technology that could be enabled by AI chips (e.g., from NVIDIA) inside an MEP 1703 that can determine what various visual sequences represent, the type of sound it would create, what the lead time is before reaching the MEP using distance-estimator tools, and then converting that visual sequence using a predictive model into a noise cancelling sound pattern like found in many headset microphones today, by harnessing digital signal processing (DSP) 1704, though this approach should minimize the need to cover one's ears with any apparatus.

Figure 13:
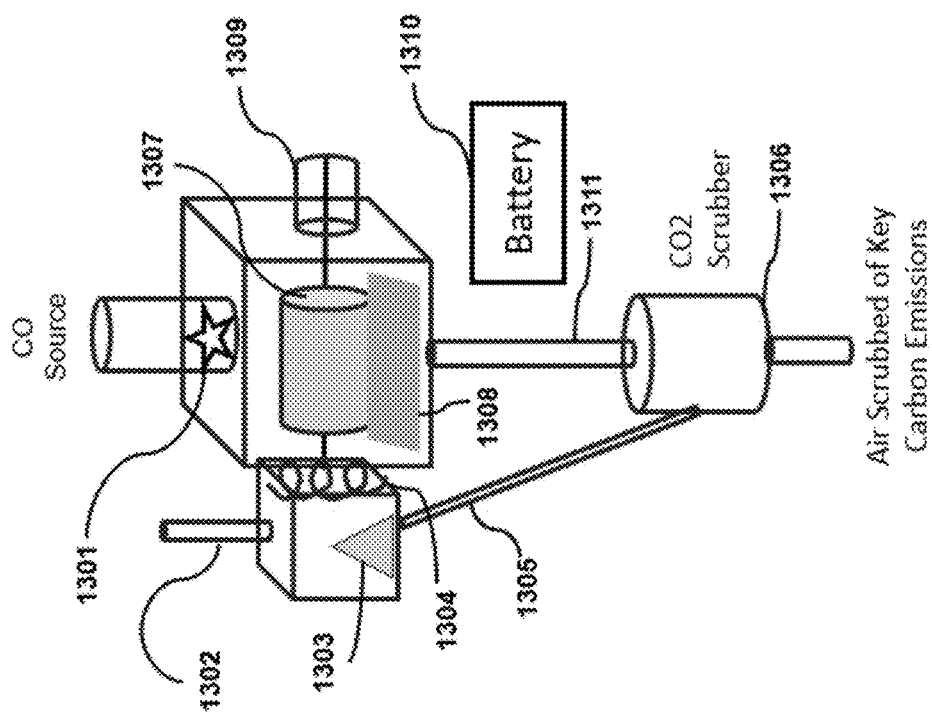
FIG. 13 is a view of the mechanism for a carbon monoxide (CO) scrubber for individual HP and also local-area pollution control.
Figure 12:
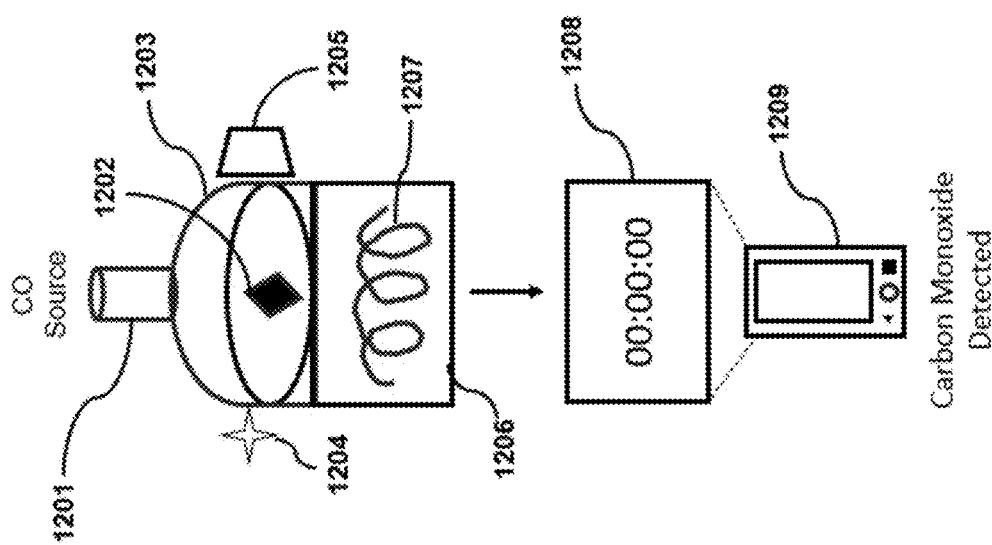
FIG. 12 is a view of the mechanism for a do-it-yourself (DIY) carbon monoxide (CO) sensor process for use in disasters.

Another set of HPI mechanisms are a DIY carbon monoxide (CO) sensor method, ingredients, and components for disaster scenarios, and a CO converter. FIG. 12 illustrates the CO sensor, while FIG. 13 shows the carbon monoxide scrubber mechanism to remove some portion of carbon monoxide found in the air intake to the HPI subsystem for the air mixture returned through the exhaust vent using exothermic chemical reactions, such as quicklime's reaction with water, a copper cylinder serving as a catalyst, with a heat source and rotational mechanical energy to brush the cylinder of accumulated residue from processes equivalent oxidization so as not to impede the catalysis, and thus serving as a converter mechanism; then performing the actions of that capture the gaseous carbon dioxide in said carbon dioxide scrubber mechanism. Relating to FIG. 12, a key problem is sensors are difficult to replace during a disaster, making DIY and right to repair nearly impossible without a contingency plan. FIG. 12 offers a general mechanism and method for these scenarios, starting with the most dangerous (since kills most quickly), but applicable to the depletion of oxygen or $CO_2$ reaching toxic levels. In this scenario that there is no CO sensor due to lack of materials or damage to a built-in sensor in the MEP device, an embodiment enables the creation of a DIY sensor based on the use of hemoglobin powder 1202 (from dried blood) reacting in a clear container 1203. Carbon monoxide from intake 1201 bonds with hemoglobin approximately 200 times more strongly than oxygen, which hemoglobin releases much more quickly under a certain amount of heat from a controlled heating element 1207 (or under lower partial pressure of oxygen in an atmosphere via air pump 1206). This means that in the presence of CO, hemoglobin will stay a brighter red longer than air with no CO to be detected by light source 1204 and computerized light color sensor 1205 with pre-programmed trigger of color intensity after period determined by time 1208 of time, or those colorations can be logged at various levels of time for color intensity for programmatic comparison using smartphone 1209 running the program. The smartphone can, after detecting the CO emissions at intervals from the wireless sensor data, run a program to wirelessly activate the CO converter similar to the activations of the CO2 scrubber.

For CO2 and O2 DIY/RtR sensor options, similar to CO's option noted here in an embodiment for this scenario, the CO2 detector uses a photodiode receiving light from a light source to see level of light making it through the solution, and the smartphone receives the results, as calcium carbonate sediment cloudiness builds, thus reducing light transmission through the calcium hydroxide solution. In the case of need of an O2 sensor, it is more like the CO detection, where steel wool is treated with acetone to accelerate rust oxidization, to see to what extent over a time interval the reddish rust discoloration is significant enough of a change in color for the smartphone program to detect and be used to activate the O2 generation subsystem.

Relating to FIG. 13, how the CO converter works is similar to catalytic converters in cars, but without the use of expensive, scarce, and theft-prone platinum. Carbon monoxide is catalyzed to take incoming oxygen in the air feed to further combust and oxidize the CO into CO2. However, this means that CO2 must also then be removed later in the process to ensure carbon-emissions are reduced significantly with an objective of CO2 reduction that enables achieving the objectives noted in the users smartphone calendar or other explicitly-stated or predicted activities list over an individual. The mechanism of FIG. 13 has its process start after sensor detection indicating levels of CO sufficient to warrant activating the subsystems via wireless microcontroller. There is a time-activated valve and fan to let in CO-filled air at 1301 that waits for the quicklime-to-slaked lime process 1303 to complete once water added at 1302, and heat, aided by quicklime's exothermic reaction heat transfer, but in addition or instead, heated by battery power 1304, to be sufficient for the converter system (or it can alternatively be thermostat-driven). This then activates the CO2 scrubbing process, first generating slaked lime solution output, which goes via tube 1305 to the CO2 scrubber reaction chamber 1306, where it awaits air with significant levels of CO2 that require capture. Based on experiments, the heat generated from the quicklime can generate up to 250 degrees Celsius in heat, and this amount of heat alone, when using a heat exchanger from the water-and-quicklime reaction chamber, could then heat a copper-plated cylinder 1307 to an adequate temperature (250 degrees Celsius) to be able to start its own catalytic oxidization process that converts CO to CO2. However, a separate heating element 1304 tied to the battery 1310 and interfacing with the CO oxidization chamber housing the copper cylinder and insulated from the water-and-quicklime reaction chamber so as not to lose heat to the water-and-quicklime reaction chamber. However, if there is a large quantity of CO2 that needs converted, then there may be a need to conserve the heat of the water-and-quicklime reaction chamber so that the resulting slaked lime is higher in temperature, and thus has higher solubility for the slaked lime reactant, to then increase the CO2 capture capacity of the given volume of solution. Thus a shielding mechanism can be moved into or out of place that allows, or instead blocks, heat from leaving the water-and-quicklime reaction chamber to heat the copper cylinder housing to improve catalysis if needed.

However, then the challenge is that the copper surface itself builds a residue from the oxidization that then reduces its capacity to do the CO-to-CO2 conversion. But by using a copper wire or similar brush 1308, and rotating the cylinder via motor 1309, the residue is scraped off, experiments show, for the process to continue unimpeded as scrubbed gas is pushed by fan through a pipe 1311 into the CO2 scrubber chamber 1306. The CO2 can be scrubbed using the CO2 scrubber in the first embodiment, or in different embodiment, be a separate system, effectively serving as a catalytic converted option and accessory to other carbon-based fuel portable generator, which typically emits 1.5 kg of CO per hour of operation, according to the Federal Government's Consumer Product Safety Commission.

Figure 15:
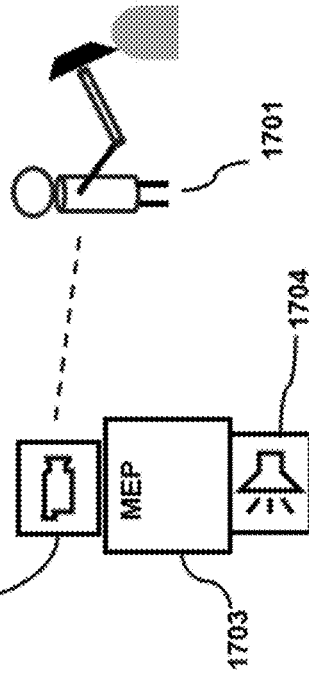
FIG. 15 is a simple view of a micro-targeting headset.

There is also, in the first embodiment, an attachment accessory headset FIG. 15, and associated mechanism for users of the said human performance improvement subsystem for micro-targeting the outputs and thus benefits of the said human performance improvement subsystem to a smaller and more concentrated area closer to the users sensory inputs and respiratory intake, comprising a typical wired 1503 and plugged-in headset's frame 1504, earpieces 1506 to either cancel all noise if cognitive tipping points analysis show the person is easily distracted (reducing performance), or needs guidance on current work or situation or just a dopamine boost from music (both increasing human performance), and microphone attached to arm 1505 but also including an air tube that is itself attached via air tube 1502 to the exhaust of the MEP 1501, and optionally a wearable pair of powered visor or eyeglasses 1507 capable of offering augmented reality, wherein the electronic components of the headset can be accessed and operated via wireless, Bluetooth, or wired connections to MEP or to smartphone or other device.

Other survival and human performance improvement mechanisms can be added as needed, and wherever electricity is required in any of these mechanisms, it will derive it from the RCE subsystem, as long as there is sufficient power (i.e., battery size, and charging capacity for it).

Now for an explanation of the principles used in the HPI subsystem. Current and future human behavior and human performance are under extreme strain and threat as result of people's (both individual and on an aggregated basis) past human behavior and human performance, whether it be in climate change, environmental pollutants in the air (where toxins like lead in the air were considered to have led to a significant increase in crime and educational attainment [3], or information pollutants found on social media, and various addictive behaviors like anger and grievance, affecting individual mental and physical health. However, it also affects societies in critical ways, such as crime, education, resource over-consumption and waste, and the erosion of personal responsibility and workplace reliability. This results in productivity stagnation or even losses that dampen economies, to misinformation that destabilizes societies. And it seems to be stuck in a doom loop wherein it is activating even worse behaviors across the globe that have been studied by behavioral scientists for a catastrophic phenomenon termed Behavioral Sink [4].

One could argue there were various tipping point events that led to this decline in the prospects for human behavior and performance, ranging from the Great Recession to the advent of social media to the rise in political anger, etc. But in order to improve individual and societal performance, we must change the way people think, and improve it to increase stability and improve people's economic and quality of life situation, and society's future prospects.

This relies on identifying "cognitive tipping point" (CTP) for motivation and engagement (via dopamine) 401 and for cognitive capacity 402 sets for individuals, as illustrated in FIG. 4, that must be navigated, since the opportunity or threat (such as from task saturation/panic 403) exceeding them can mean significant changes to processes undertaken by humans, and the positive outcomes or catastrophic results that arise from those processes. This means that cognitive bandwidth (the space between a cognitive capacity limit and the current cognitive load) must be increased, to improve the ability to learn, remember, and think and "connect dots." This invention also seeks to broaden the concept to include the neurotransmitters, such as dopamine, required to motivate people and make them "feel" better about constructive processes and being reliable and productive. By adding in neurotransmitters to the equation, we create the concept of "comprehensive cognitive bandwidth" (CCB), which is the highest priority measure of the capacity for human behavior and performance to excel for personal and the greater good. My discovery was that each person basically has their own cognitive load levels for which tasks will degrade in performance. A key reason for this invention is that environmental pollution, including "heat pollution", is reducing CCB. And carbon emissions and heat are key culprits, and steadily getting worse, as this year of 2023—the hottest year on record, with records falling most every year—has shown.

Figure 9:
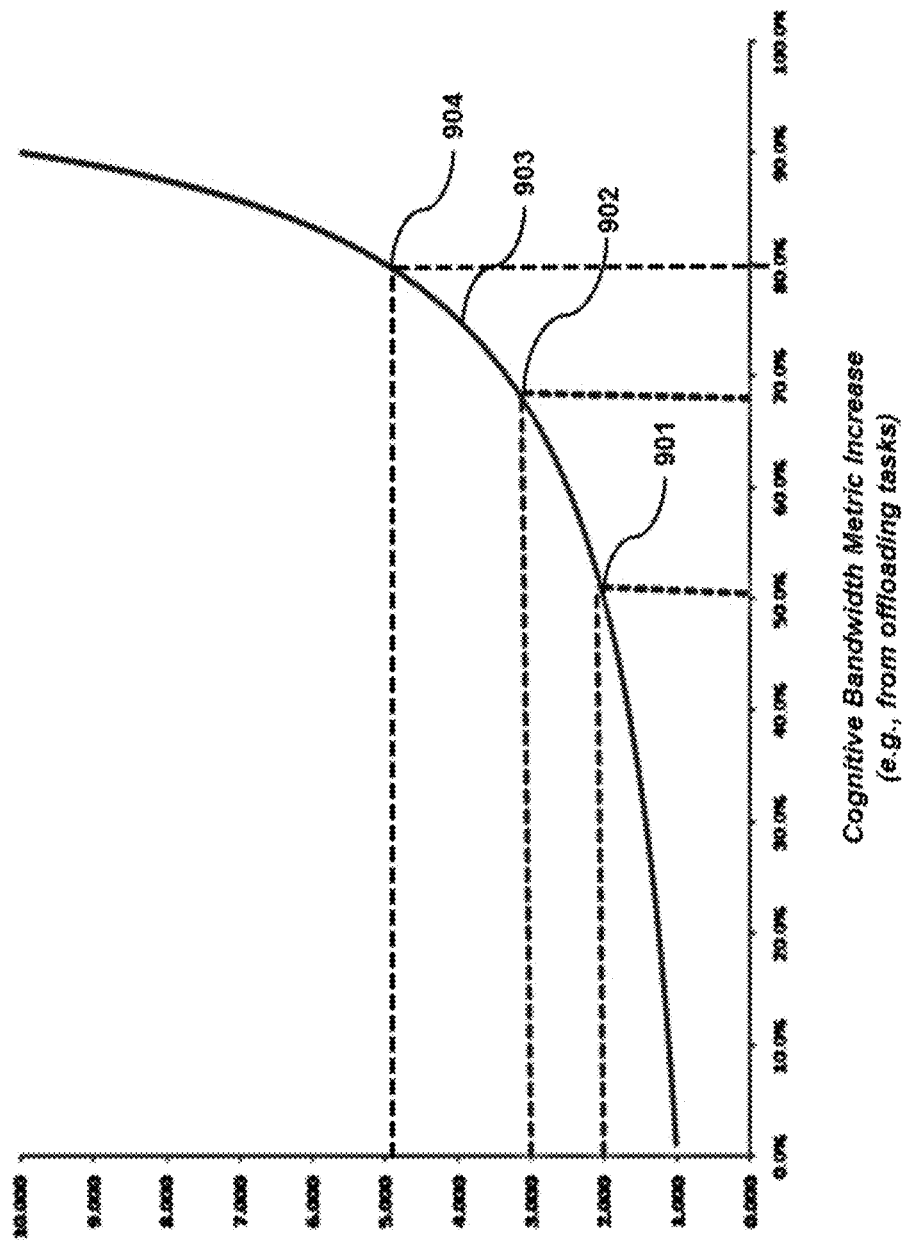
FIG. 9 is a graph showing arbitrage on tasks using Process Arbitrage (PA).

Load balancing to stay within the optimal range of positive and negative tipping points is key to CCB. The carefully planned use of various input resources can help humans and the mechanisms that serve them to stay within an optimal range, and thus maintain an optimal path by following an optimized process centered around these tipping points, which is termed "process arbitrage" (Veluswamy, 2008). Process arbitrage is a critical part, and foundation for the subsystems, of the invention. Process arbitrage's significant results noted previously by researchers in the U.S. Military, including helping transform Military Health in terms of higher reliability (Wright-Patt Med. Ctr., 2015), and also confirming its ability to be applied into technology in a cover story article of a peer reviewed journal (Mort et al, 2017). In short, predicting supply and demand based on human behavior and human performance constraints and objectives is foremost the priority, and advantage, of this invention—human behavior drives most everything that matters to persons and societies, and human performance (behavior focused on achieving desired, and desirable, goals) is critical. To illustrate, FIG. 9 shows Process Arbitrage's disproportionate returns from hidden information of cognitive capacity and delayed gratification composite tipping point 902, with 901 showing the rate of task performance with lower CCB, while point at 904 shows the disproportionate rate increase once above this desired CCB tipping point (the "hidden" information). One task moved off from the arbitrage area 903 is worth TWICE what two tasks moved off from the no-arbitrage area below 901.

Figure 8:
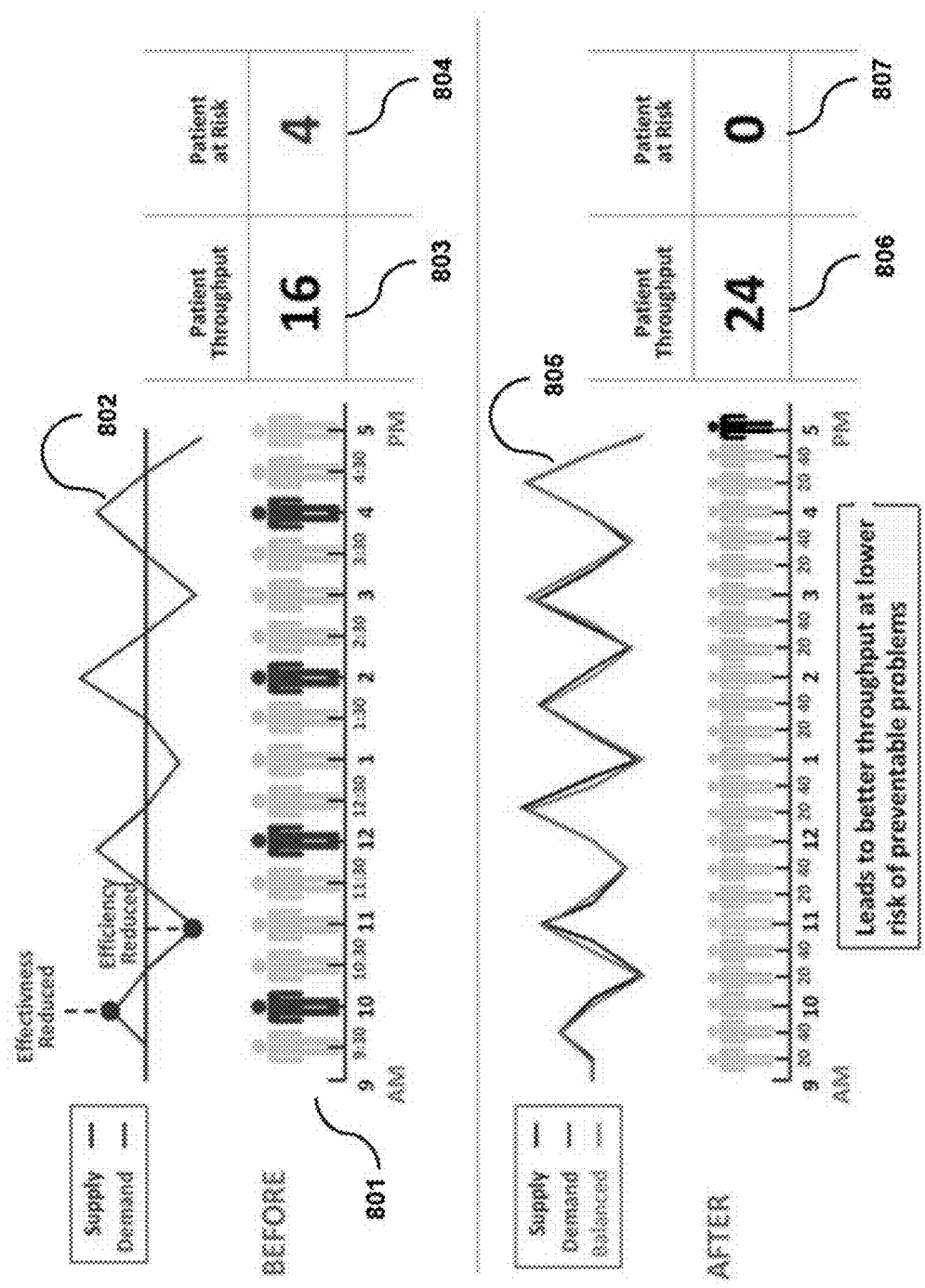
FIG. 8 is a graph showing static versus dynamic cognitive capacity supply curve meeting dynamic demand curve.

In the past, load balancing typically only focused on the "demand side"—that is, the cognitive load, and ensuring load was balanced to reduce instances and risks of exceeding adverse, negative CTPs, while ensuring surpassed engaging, positive CTPs. However, this invention addresses also the "supply side" of the equation, enhancing cognitive function in various combinations and intensities such that it actually increases the ceiling of the CTPs found in overall CCB as illustrated in FIG. 7 of supply and demand from the cognitive science view, and manages this capacity—by increasing supply due to FIG. 6's increases cognitive function from $CO_2$ scrubbing 601 (Usha Satish et al, 2012) from high to low levels 602, especially in motivation and drive 603 and reasoning and problem solving 604 (which involve spatial and multi-tasking abilities also)—such that it bends the supply curve to better meet the demand curve as illustrated in FIG. 8, in the past by adding MORE PEOPLE, but now can be accomplished by getting more out of EACH PERSON. For example, if patients 801 coming in over the course of the day have different load levels for doctors, this translates into a load curve 802, wherein when that load exceeds capacity to service the opportunity to solve patient's problem, results in slower patient throughput 803 and more errors 804 in care. But once supply can be bent to match demand more closely 805, these over-/under-loads no longer lead to slowdowns 806 and errors 807. The end result is that "safe throughput" on tasks rose dramatically by navigating tipping point constraints (Elnahal et al, 2015). In the first embodiment, this is accomplished via Human Performance Improvement (HPI) mechanisms that are activated or deactivated using the wireless controller (e.g., Raspberry Pi Pico W) and a multichannel relay (for heater, pump, fan components). It is also based on a computer-driven predictive model that focuses predicting the CTPs and cognitive load, and thus overall CCB, over a time-frame, and then computes the optimal path of actions in terms of sequence, combination, and levels of intensity, to be able to most optimally match the supply to demand.

However, all of this needs electricity to operate, especially if we want to or need to conserve scarce chemical inputs required in a group of the HPI mechanisms. Moreover, some of the resources and components involved in HPI can also be shared and synergized with creating this electricity top operate the activation/deactivation of mechanisms.

A critical value of this invention is that it enables "Energy Arbitrage" that brings to an end the "All or Nothing" mistake. In the past, there was an "all or nothing" approach to capturing and capitalizing on energy. Over 80% [5] of energy sources need to get to full combustion (i.e., greater than 450 degrees to burn coal, gas, oil, or firewood) to even "bother" to generate energy. That is, over 80% of U.S. sources of power require something to be burned to get a temperature worth harnessing. So means most other energy simply ignored. But there is a lot of energy below that 450 degrees Fahrenheit temperature being ignored and that could be supplied by other high-volume, greener sources. In fact, with global warning (from the greenhouse effect of greenhouse gases), this non-combusting energy is steadily growing all around us. The question is how to capture it. And this "ignored energy" adds up to kilowatt-hours per household that could instead be arbitraged—that is, hidden power.

Heat energy is growing on Earth, but ironically the problem is that with increasing heat, two of the largest forms of renewable energy, which are solar power from photovoltaic cells based on silicon wafers and wind power from windmills generators, reduce in efficiency or output in higher heat that cause heat domes, a rising problem around the world, especially in urban areas. For solar it can be as much as a 25% reduction (down to an efficiency of 15% or less), and for wind as much as a 30% reduction in wind reaching windmills as my application research has shown, since heat domes create a barrier to wind coming inside the heat dome area. Thus, there is the paradox where more ambient energy actually leads to less energy output. However, there is an opportunity—more heat means we are closer to activating more efficient forms of energy conversion—ones that actually harness heat, most simply and importantly, the steam turbine.

The problem is that conversion of heat below the "tipping point" of working fluids (such as water relies on conversion mechanisms to the "universal currency" of energy that can be most easily stored and transferred, which is electricity) have poor efficiency in those conversions. For example, a thermocouple, or array of them creating a thermopile, typically has only about a 7% efficiency. A Stirling Engine with a working fluid of air only 2%, though it can, with changes to working fluid and more intricate designs (which we employ) achieve 15% or more. Steam turbines, however, offer a significant increase in conversion efficiency—typically 35%, but in some situations, 45% or more. However, the challenge is the activation points (which in this context, we call a form of tipping point) when the working fluid can begin to increase dramatically in volume, and thus pressure and force to do work. This depends on the boiling points of the working fluids. So in this case, the working fluid of water to generate water vapor, or steam, is 100 degrees Celsius. However, for methanol, the tipping point is lower, being only 64.96° C. (148.93° F.), so an engine that is specifically constructed to address the flammable liquid safety and corrosive liquid maintenance, meaning the completed engine or its materials are actually available for the embodiment, can actually begin generating more efficient power, at least over the efficiency of the default thermocouple, at a lower temperature.

In fact, by utilizing different working fluids, then constantly computing, using artificial intelligence that has been proven (U.S. Pat. No. 8,515,777 BI) can maximize cost-effectiveness of desired outputs by navigating various tipping points (i.e., the inflection point of a curve, where problems or opportunities rise at a much faster rate) and "arbitraging" (i.e., getting disproportionate returns from hidden information, which is what many tipping points are) how much electricity will be needed to achieve the specific objectives of its ultimate driver of consumption, which is a human user. Load balancing the use of various input resources to stay within an optimized process (termed "process arbitrage" (Veluswamy, 2008), which is more specifically "energy arbitrage" in this context)

The advantage of this invention is that by "investing" a certain amount of energy, a disproportionate amount of energy can be gained because of the properties of working fluids such as water or, for lower temperatures, fluids like methanol. If more heat is given to reach the boiling points where vaporization would occur and thus volume increases, then in a closed system, this would lead to pressure that results in force—force enough to turn a turbine and generate electricity when the turbine is connected to a dynamo to convert rotational energy into a electricity.

However, what the predictive models performing tipping point arbitrage (TPA) must consider are capacity constraints, reserves of other necessary inputs, over-consuming limited resources prematurely when unnecessary for demands, etc. This is a core of the invention, which relates to prior art in the form of patents (U.S. Pat. Nos. 8,073,731 B1, 8,407,081 BI, 8,515,777 BI) related to process arbitrage, how to achieve it, and with significant results in human performance and high reliability noted previously by researchers in the U.S. Military.

Figure 10:
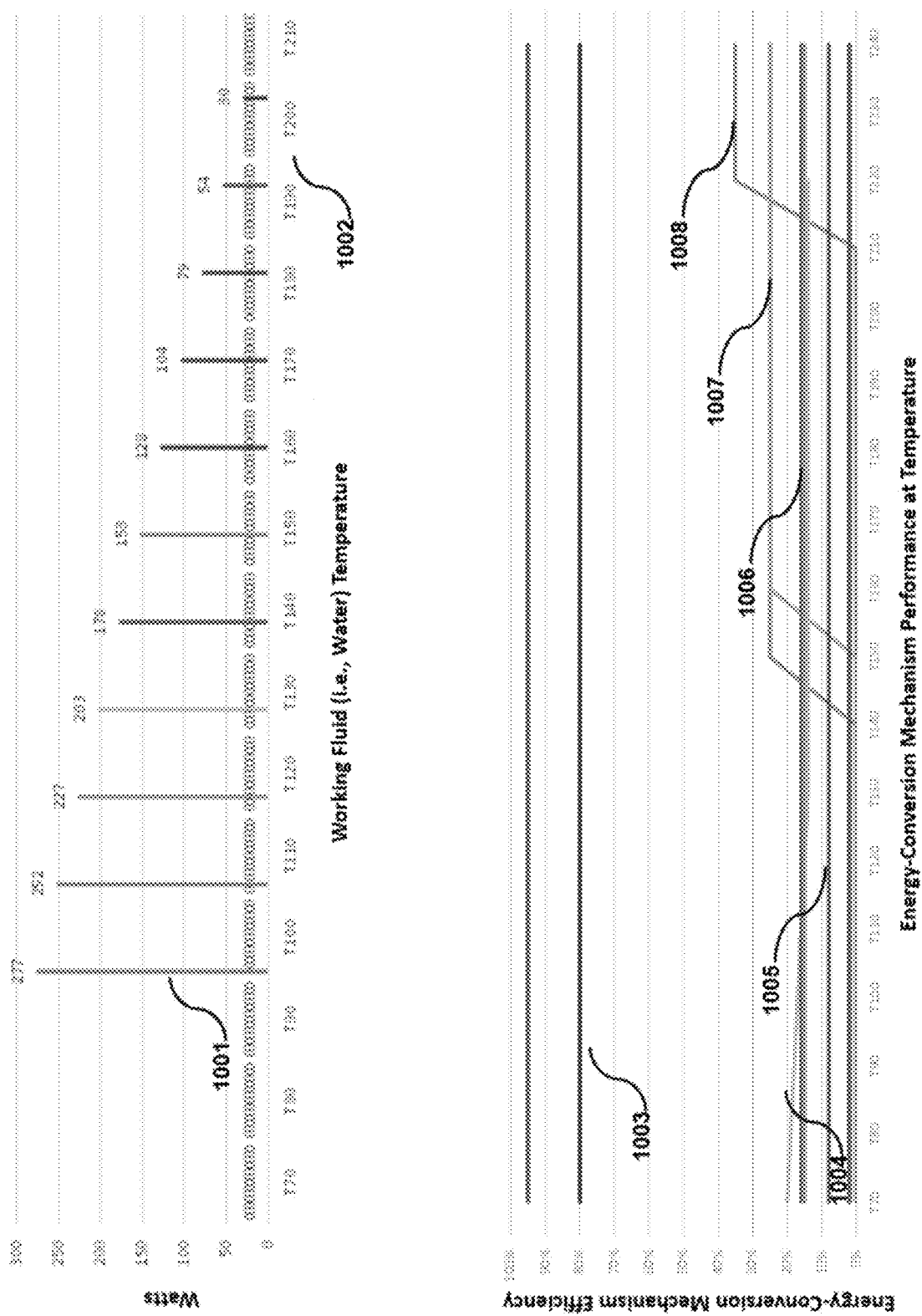
FIG. 10 is a graph showing efficiency step-up hedging and arbitrage on various energy-conversion mechanisms using Energy Arbitrage (EA).

An AI-based, arbitrage-driven controller mobile application, or optionally an integrated circuit (using microchips, a breadboard, etc.) in the event of network Internet outages, are components to take hidden information of: a. predicting tipping point, that then b. mechanically activates certain subsystem mechanisms, to c. manage "reserve energy" to activate a much higher available power conversion than currently available—if the system can give just enough reserve energy to apply at a strategic moment when trying to meet threshold for different source and/or mechanism, such as the tipping point for the steam generator engine activation, as seen in FIG. 5, where showing a key tipping point harnessed for Energy Arbitrage, with heating of water expanding it only slightly (4%) when heated from room temperature 501 to just before boiling 502, the tipping point for water (i.e., from liquid water to gaseous steam, at 212 degrees Fahrenheit), with a volume increase of 1600 times 503. In a closed system, this then leads to a dramatic increase of pressure. This pressure can then be harnessed as force to do work, such as push a turbine, that can then turn a generator for electricity. For example, if it is an AM time and the temperature is rising, and no rain is forecast, then we should not hedge the heat accumulated, because it will likely continue to rise. However, if it is PM and the temperature is falling, or it is about to rain, then we should "cash in our chips" and trade the heat we have for electricity, and hedge the energy we have accumulated thus far. Just one example of how this can make a difference is "cashing in" 120 W from solar cells one day as a hedge to apply to making 600 W the next day with steam from heat that will last twice as long as direct sunlight (e.g., from residual heat from blacktop, heating water-based thermal battery from the bottom, in an urban heat dome, which also traps $CO_2$ and other pollutants). So for these 2 days, we have averaged 300 W/day rather than 120 W/day (150% more, or 2.5×)—more than double the output without EA. A key analogy for the MEP is this starter energy is like the seed to grow a plant—as opposed to just eating the seed, so it is termed "seed energy." FIG. 10 shows the amount of energy in watts needed to capitalize on the tipping point of water turning into steam (which releases a significant amount of pressure and thus force to power a much more efficient mechanism to convert energy—the steam turbine generator. To elaborate, water at a 100-degree Fahrenheit temperature 1001 requires at least 277 watts to reach boiling, while near boiling temperature 1002 needs virtually none. Efficiency of various energy-to-electricity conversion mechanisms show that hydroelectric dams 1003 are one of the most efficient. Photovoltaic solar cells 1003 start at around 20% average efficiency, but then drop as heat rises. Thermocouples 1005 stay at roughly 8%, while a Stirling Engine 1006 in the embodiment reaches about 20%. A methanol-based vapor engine 1007 reaches about 25%, while a steam engine 1008 achieves the most cost-effective high efficiency at 35%. This is where EA takes over—planning what demands of the user will require what amount of energy, and how to carefully allocate battery reserves as seed energy to achieve activation of a better mechanism. Sensors (that look primarily for pressure or temperature throughout the device, but also look for certain gas concentrations in the local environment) are used for checkpoints to determine which mechanisms are functional, what they can do, how efficient they are, how much data there is to make predictions, and so forth. These sensors feed programs on smartphones that can be uploaded to a server for calculations for the predictions (Brennan et al, 2012), or done on the smartphone itself in the form of an app built similar to what has been done before (Mort et al, 2017). Wireless controllers activate or deactivate systems through relays that supply power when needed to meet a system objective toward electric power, performing a survival essential, or optimizing human performance to meet an objective of an end user.

Figure 16:
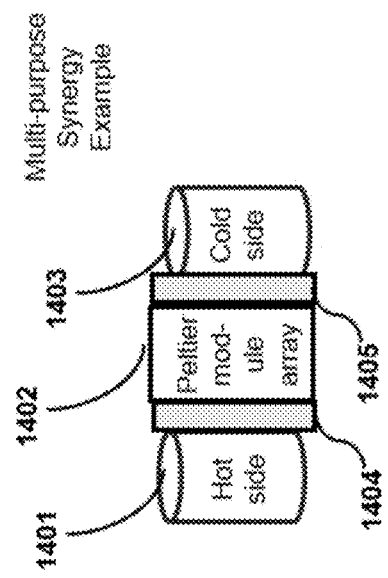
FIG. 16 is a visual of a corkscrew geothermal heat conductor component and optional modification to create a thermopile electrical generator mechanism.

As part of the first embodiment, the renewable clean energy subsystem portable puncture-resistant container subsystem contains two or more energy-conversion mechanisms, primarily focused on converting heat, comprising: a heat pipe system containing one or more working fluids, an insulated copper wiring system to transmit electricity and heat in the said foldable box structure (valuable as a "knockdown kit"), a dynamo mechanism to create electricity from rotational energy, consisting of one or more dynamos connected internally or as needed externally to the box. Then there is also a battery to store energy from the dynamo mechanism, a crank connection mechanism to connect to the dynamo, a turbine connection mechanism for wind, water, and other sources of mechanical energy to connect to the dynamo. In addition, there is a solar heat collector mechanism and optionally a solar concentrator if the ability to obtain a large enough lens or to make a fresnel lens to concentrate heat exists to heat multiple types of working fluid, such as water alone, or in combinations that improve the thermal properties or boiling point more favorably. Furthermore, as FIG. 16 illustrates, there is a geothermal energy mechanism "root structure" for the subsystem comprising an augur-based corkscrew 1603 mechanism to serve as either a heat sink or a heat source for the MEP 1602 to enable greater heat transfer opportunities to the ground 1601, and which optionally can be modified to actually become a single thermocouple or an array of thermocouples to create electricity from heat transferred down to it via thermal working fluid storage component 1604, comprised of a heat pipe layer placed on the upward-facing portion of the threading 1605 of the corkscrew, which has a heat transfer working fluid make contact with this top metal, which consists of copper, and then a zinc-plated or galvanized steel on the down-facing portion of the threading 1606 to have the temperature differential generate an electrical current that can then be tapped by the MEP above this geothermal energy root structure, with copper side being the anode zinc side being the cathode of this "geothermal battery."

To provide a list, there is a mechanical energy root structure for the subsystem comprising an augur-based mechanism to serve as enabler to bring rotational energy to the dynamo set of the RCE subsystem when a straight rod type of driveshaft is not possible. There is also a heat energy-conversion mechanism comprising a set of thermocouples like Peltier module, whether one Peltier module or an array of Peltier modules. Then there is also a heat energy-conversion mechanism comprising a steam engine built primarily with 3D-printed components such that there is relatively low weight of the parts (and thus lower activation energy requirements). In addition, there is a heat energy-conversion mechanism comprising a Stirling Engine built primarily with 3D-printed components such that there is relatively low weight of the parts and with an annular pipe as its regenerator and adequate sealant capability for relatively safe usage of hydrogen as a working fluid. To be able to fill hydrogen into the Stirling Engine as a working fluid, there is an electrolysis mechanism shared with the HP subsystem. In order to assist in food calorie growth (or simply plant growth for a different approach to carbon capture), there is an optional Tesla coil system or other spark generator powered by the EA subsystem to add as surface module to outdoor MEP to increase potential yield of plant growth whether for crop foods or carbon capture where soil may be nitrogen poor. Then there are various attachment accessories that can be energy conversion sources, especially from human power, such as an attachment that provides mechanical energy powered by humans exercising beyond a traditional crank or bicycle attached to the turbine, but instead uses boxing-themed attachments that use a method of cranking similar to the motion of a speed bag that can be lifted and held in front of a person's face as a person rotates dual cranks on either side of the mechanism and a small dynamo and rechargeable battery accumulate a charge that can then be transferred back to the MEP's RCE subsystem, and additionally an attachment that places a series of magnets in a magnetic coil layered onto or inside of a pair of boxing gloves wherein a method of use would be the back and forth punching movement to obtain current that could be rectified to again provide charge to a rechargeable battery in each glove to then be downloaded as electric current to the MEP's RCE subsystem. Additional energy generation or energy conversion mechanisms can be added as needed, and wherever electricity is required in any of these mechanisms, it is supplied by using electricity generated from said renewable clean energy system.

The MEP invention is "multiplicative", extracting more energy output from the same amount of ambient energy input. Then, due to the force multiplication, synergizing the various energy inputs and its outputs, including human's energy and activities. This is in order to create better inputs to people's activities (e.g., electricity and also an environment more optimal for cellular metabolism, impacting human behavior and performance). It is also for better outputs from people, such as making them more highly reliable in groups, and more self-reliant individually. In short, it increases resilience, making people better and societies stronger with all it accomplishes, especially simultaneously.

There are also shared resources that lead to scale economies in addition to versatility to address any set of problems in HPI and RCE the invention may face. As discussed in one example, heat recovery from one process (e.g., warming snow for getting water, then boiling the water to make it drinkable) can be harnessed by the heat energy conversion mechanisms in synergistic ways, such as enabling heat transfers for heat arbitrage through heat sources or heat sinks, that then also can speed obtaining of not only the drinkable water (i.e., warmed and cooled faster) but also electricity in the overall synergized process. Moreover, the electrolysis systems that generate oxygen from water can also be used to supply hydrogen as a working fluid to buried-underground MEP. And of course, there is the sharing of heat, which can lead to benefits to both systems (e.g., solubility of slaked lime is increased with higher heat of the solution, thus capturing more CO2), since both want to maximize energy production in order to create more opportunities to run mechanisms.

The unexpected benefits of MEP design is it is not just an array of possibilities, but regulated by a force multiplier, where various energy is not just generated and accrued. Rather, it is used as a catalyst to progressively get to higher levels of energy conversion efficiency once it reaches the physics tipping points of activation (e.g., boiling temp on steam engine, high Delta T on Stirling Engine, etc.) on each. It then arbitrages the various energy available to leverage it towards a much greater, disproportionate returns at the right time. The "last line of defense" toward ensuring this goal is a human operator, alerted to provide the extra push by the crank generator, and this crank generator is the initial building block of the Energy Arbitrage component of the MEP invention. The MEP invention is designed to be not only a "right to repair" type of tool for people, but also a teaching tool for STEAM education to improve people's ability to repair the machine and other machines, and offer a foundation for not only higher education in college, but also for the trades. It also uses the same components for providing multiple functions, such as thermocouple for both potable water and generating electricity, which can even occur simultaneously, and above all looks to maximize not only energy generated, but also at the same time the human performance generated, by removing carbon emissions that adversely impact cognitive and physical performance, using the same heat energy of the chemical reactions for human performance (e.g., of quicklime and water to remove CO2, hydrogen peroxide and bleach to generate O2 offsets to carbon emissions, etc.) as a source of energy to make electricity or to be stored as heat energy for use later. It is coupled with an effector of a mobile web solution tied to a smartphone for helping manage the individual's predictive modeling and early warning and intervention by the user and machine, and also tie to a mobile network and electronic business community of people living in an area or moving in and out of areas that seek to understand where perils to cognitive bandwidth and human performance currently exist, how it would impact task saturation (i.e., task congestion or "task jams") and thus reliable if task sets, including safety checklists, work quality checklists, and other best practices, policies and procedures, etc.

FIG. 8 summarizes one of the greatest benefits of the MEP system, as noted in the previously stated description of FIG. 8. The same principle of Process Arbitrage (trading of a set of supply resources to better match the demands requiring those resources) applies to Energy Arbitrage also, as both use tipping points arbitrage. One would see, in the top half, a zig zag of demand peaks and troughs, and a flat line of capacity, but one being even lower than the cognitive capacity line shown currently (since for human performance and energy conversion efficiency, the gains can be over double, to as high as triple or more). Then the bottom half would show the capacity line still able to track the demand line, given the leverage from tipping points arbitrage to make up the current shortfall via disproportionate return leverage. In a perfect world, there would be unlimited resources to get everything done. But in reality, prioritization and even triaging must occur to yield the greatest net returns (i.e., highest benefits from the lowest costs). To increase the net return, it is critical to understand that in most situations, especially those dependent on human decisions, demand is not constant, and often intermittent in its frequency and intensity. However, if both the supply and demand can be predicted, then it can be better matched, thus reducing wasted resources as well as unmet needs as FIG. 8 shows. Moreover, if the saved resources can be leveraged later, as EA does, by, let's say, increasing energy conversion efficiency from 10% to 30%, then that saved resource that as "hedged" can be arbitraged for something much higher (in this case, 3 times higher in total, or 2 times higher on net). But it is precisely because of this hedge and cashing in energy early, or triaging to prevent its premature use and saving it for strategic use later, that we have the force multiplied opportunity that then yields a greater net return overall, even though demand exceeded supply on average (i.e., at least if there was no EA in operation).

Extending FIG. 8—there is a triage-based conservation where the user is informed at the moment they expect energy, or even request it, that the energy should be conserved to not only generate disproportionately higher energy later (sort of like a "gamble" to hit a "jackpot"), but also that based on analysis of priorities factored into the analysis and predictions, that the greater energy that EA can help them produce can then be used for something more important on their schedule in the near future, versus the lower priority activity (based on their own weightings the user assigns, or the inferred weightings the predictive model accrues over time) they may want the energy for at this moment. The user can override of course, but would be told the consequences. And they would be told what the contingency plans could be (e.g., get more resources, such as reactants for the machine, get or generate the power from elsewhere, learn what can be done to conserve such as unplugging an unused electrical device, etc.). A crucial part of this approach is clearly persuasion—motivating the user conserve, including the why and the how. But this is precisely what Cognitive Free Return Trajectory (FIG. 11), which looks at a delayed gratification tipping point 401 of FIG. 4, determined by the TPA predictive model of the user to determine if and when to ask the user to take a risk that can be convinced to have a valuable enough payout (since dopamine is highest when, for something someone wants, they believe they have a 50-50 chance of getting it, not much less of chance and, interestingly, not more of a chance either. Dopamine actually is a "feel good" chemical, having effects that sort of combine the "rush" of adrenaline with the pain relief and soothing effect of an opiate. The premise of FIG. 9's CFRT (explained in detail in U.S. Provisional Appln. No. 63/406,633) is that it is nearly impossible to block or fight the "gravity" of this quest for dopamine and the object exerting that undesirable influence 1101 (e.g., unnecessary consumption), but small redirections over time 1102 and swapping out for an even bigger dopamine release gravity 1103 can accomplish this persuasion better than logic and reason, especially in a population exhibiting characteristics of Behavioral Sink growing today. In short, the embodiment counters this without fighting the wave (of dopamine) but rather (redirecting and) riding it. As one would imagine, this can then extend outward to encompass other energy utilization and paths to reduce or swap out their use, and thus conserve more power than just what is produced by the MEP. Moreover, this principle applies to the crank—this chance to "win" a jackpot of energy is a way to get more energy into the MEP (that can then be used as more reserve power as a seed to force multiply in the future under the right conditions). It is almost like playing a slot machine, where people are used to pulling a crank. This then has the added benefit of the crank usage data being used to further determine or refine the delayed gratification tipping point of the individual user (which can be determined based on the cellphone identities being in memory for each user, if there is more than one for the same MEP. As elements of the provisional patent filing for this invention had shown, the CHRO methods of increasing to higher reliability levels using tipping points arbitrage showed how it is possible to address the Behavioral Sink problem (a source of hyper-competition and high social agitation) that leads to the "Death Cross" and behaviors like disinformation creation and spread, which are destructive and addictive. The CHRO uses positive addictive behaviors/good habits against negative addictive behaviors, like grievances, anger, and cultism. It helps inoculate against disinformation (turning it into "noise"), by redirecting energies toward the production and modifications of the MEP machine, reducing idle hands and giving relief rewards in the process. Social cohesion is enhanced because the Death Cross is reversed using a viable method, not just the traditional legal and moral arguments that worked during post-World War 2 peace that has gradually faded and led to a more fascist political lean globally that is likely the result of rise of Behavioral Sink.

In summary, the invention, as illustrated in the first embodiment, and its array of HPI and RCE mechanisms don't just result in additive benefits, but rather multiplicative benefits, doubling or tripling the key benefits toward objectives as diverse as energy independence, financial independence, or activities of daily living independence. By harnessing these building block component systems, anyone can build. If one has different working fluids, adds in their known boiling points, and has engines capable of harnessing each, then they can get the benefits of Energy Arbitrage. Same with human performance and comprehensive cognitive bandwidth, where we have electronic sensor data such as from phone data, and can get historical task execution, even if implied, can implement Process Arbitrage using prior art (U.S. Pat. Nos. 8,073,731 B1 and 8,407,081 BI and 8,515,777 BI). Climate heat energy is making temperatures more volatile, but it is volatility that creates arbitrage opportunities. More importantly, is no greater "renewable" energy than human performance energy, since it drives everything else (both in terms of needs and available resources).

The invention claimed is:

1. A portable system for improving human performance and supplying renewable clean energy, comprising:
   (a) a puncture-resistant container;
   (b) a renewable energy subsystem housed within the container, the subsystem comprising at least one energy conversion mechanism selected from a Stirling engine, Peltier module, or solar/geothermal heat collector;
   (c) a human performance improvement subsystem comprising a set of mechanisms for air composition transformation, including at least one reactant-based $CO_2$ scrubber and oxygen enrichment mechanism;
   (d) a controller configured to activate or deactivate one or more of the performance improvement mechanisms based on cognitive load or environmental conditions; and
   (e) a power interface for a smartphone or embedded processor, the processor being programmed to receive data, regulate subsystem operations, and conserve energy and chemical reactants by timing activations based on cognitive performance tipping points.

2. The system of claim 1, wherein the human performance improvement subsystem includes a chemical oxygen generator using hydrogen peroxide.

3. The system of claim 1, wherein the controller includes predictive logic configured to detect cognitive tipping points based on task engagement or environmental measurements.

4. The system of claim 1, wherein the container includes separate compartments for heat-producing and air-enhancing subsystems, with insulation to manage internal temperature flow.

5. The system of claim 1, further comprising a CO scrubber mechanism using a copper catalyst to mitigate carbon monoxide emissions from enclosed environments.

* * * * *